United States Patent
Nagasaka et al.

(10) Patent No.: US 6,883,707 B2
(45) Date of Patent: Apr. 26, 2005

(54) BILL SERIAL NUMBER READING DEVICE AND BILL SERIAL NUMBER READING METHOD

(75) Inventors: Keiji Nagasaka, Hyogo (JP); Kunihiro Ryo, Hyogo (JP); Morimasa Joryo, Hyogo (JP)

(73) Assignee: Glory Ltd., Hyogo (JP)

( * ) Notice: Subject to any disclaimer, the term of this patent is extended or adjusted under 35 U.S.C. 154(b) by 0 days.

(21) Appl. No.: 10/751,406

(22) Filed: Jan. 6, 2004

(65) Prior Publication Data

US 2004/0238619 A1 Dec. 2, 2004

(30) Foreign Application Priority Data

Jan. 8, 2003 (JP) .......................... 2003-002398
Jan. 8, 2003 (JP) .......................... 2003-002399

(51) Int. Cl.[7] .............................................. G06F 17/60
(52) U.S. Cl. ........................................ 235/379; 235/375
(58) Field of Search ................................ 235/375, 379, 235/469

(56) References Cited

U.S. PATENT DOCUMENTS

| 6,128,402 A | 10/2000 | Jones et al. | |
|---|---|---|---|
| 6,785,026 B1 * | 8/2004 | Terajima et al. | 358/509 |
| 2001/0053241 A1 | 12/2001 | Haycock | |
| 2002/0036159 A1 | 3/2002 | Graef et al. | |
| 2003/0132281 A1 * | 7/2003 | Jones et al. | 235/379 |
| 2003/0189736 A1 * | 10/2003 | Ikeda | 358/475 |
| 2004/0016797 A1 * | 1/2004 | Jones et al. | 235/379 |

FOREIGN PATENT DOCUMENTS

| JP | 02-056688 | 2/1990 |
|---|---|---|
| JP | 2002-185782 | 6/2002 |
| WO | WO 98/24052 | 6/1998 |
| WO | WO 98/40839 | 9/1998 |

\* cited by examiner

*Primary Examiner*—Mark Tremblay
(74) *Attorney, Agent, or Firm*—Varndell & Varndell, PLLC

(57) ABSTRACT

The present invention recognizes denomination and transporting direction of each bill to be deposited when the bill is deposited, selectively drives two light sources with different emission colors based on the recognized information on the denomination and direction of the bill, and scans and reads the portion where the serial number of the bill being transported is printed by means of an image sensor, so that the serial number of this bill is read while selectively changing the emission color of the light source according to the denomination of the bill. Even if the character color or background color of the serial number differs depending on the denomination, the serial number can be accurately recognized without providing many light sources with different emission colors.

19 Claims, 18 Drawing Sheets

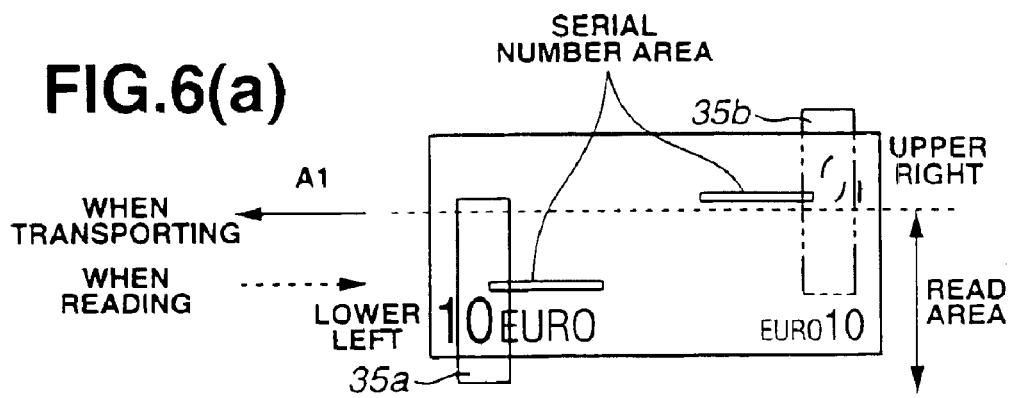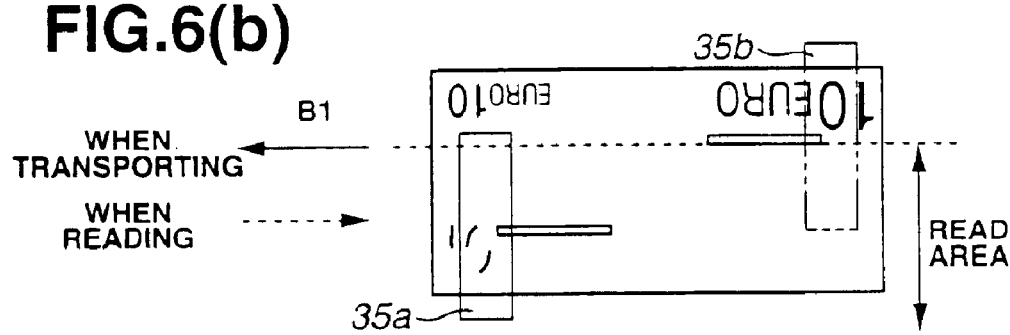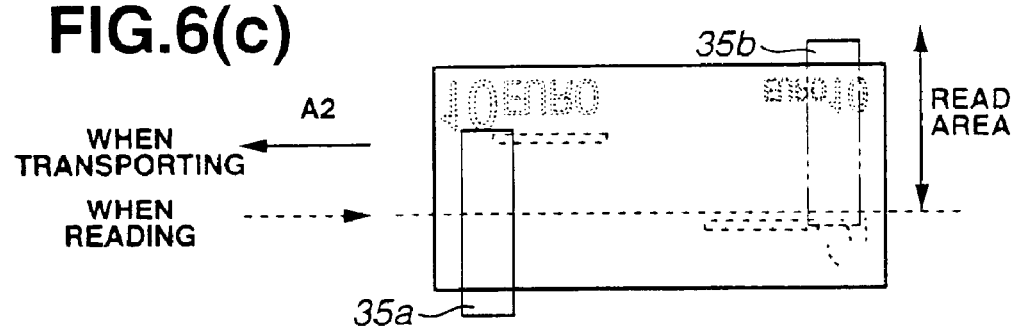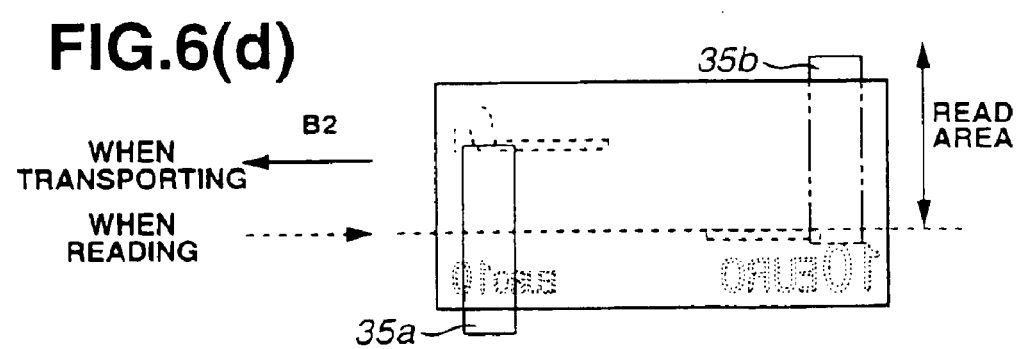

| DENOMINATION | POSITION | BACKGROUND COLOR | SERIAL NUMBER COLOR | LIGHT SOURCE |
|---|---|---|---|---|
| 5 EURO | LOWER LEFT | GRAY/BLUE | GRAY | GREEN |
| 5 EURO | UPPER RIGHT | GRAY | BLACK | GREEN |
| 10 EURO | LOWER LEFT | GRAY/RED | DARK RED | GREEN |
| 10 EURO | UPPER RIGHT | RED | BLACK | RED |
| 20 EURO | LOWER LEFT | GRAY/BLUE | DARK BLUE | GREEN |
| 20 EURO | UPPER RIGHT | BLUE | BLACK | GREEN |
| 50 EURO | LOWER LEFT | GRAY/YELLOW | DARK BROWN | RED |
| 50 EURO | UPPER RIGHT | BROWN | BLACK | RED |
| 100 EURO | LOWER LEFT | GRAY/GREEN | DARK GREEN | RED |
| 100 EURO | UPPER RIGHT | GREEN | BLACK | GREEN |
| 200 EURO | LOWER LEFT | GRAY/YELLOW | DARK YELLOW | RED |
| 200 EURO | UPPER RIGHT | YELLOW | BLACK | RED |
| 500 EURO | LOWER LEFT | GRAY/PURPLE | DARK PURPLE | RED |
| 500 EURO | UPPER RIGHT | PURPLE | BLACK | RED |
| 1 US $ | | WHITE | GREEN | RED |

FIG.7

LIGHT SOURCE SELECTION TABLE 421

| DENOMINATION (EURO) | FEED DIRECTION | LINE SENSOR | LIGHT SOURCE (EMISSION COLOR) |
|---|---|---|---|
| 5 | A1 | TOP | GREEN |
| | A2 | BOTTOM | GREEN |
| | B1 | TOP | GREEN |
| | B2 | BOTTOM | GREEN |
| 10 | A1 | TOP | GREEN |
| | A2 | BOTTOM | GREEN |
| | B1 | TOP | RED |
| | B2 | BOTTOM | RED |
| ⋮ | ⋮ | ⋮ | ⋮ |
| 500 | A1 | TOP | RED |
| | A2 | BOTTOM | RED |
| | B1 | TOP | RED |
| | B2 | BOTTOM | RED |

FIG.8

DENOMINATION/DIRECTION MANAGEMENT TABLE 422

| ID NUMBER | DENOMINATION (EURO) | DIRECTION |
|---|---|---|
| ID1 | 10 | A1 |
| ID2 | 10 | A2 |
| ID3 | 20 | B1 |
| ID4 | 20 | A1 |
| ⋮ | ⋮ | ⋮ |
| IDn | 50 | B2 |

FIG.9

| LIGHT SOURCE | DENOMINATION | | |
|---|---|---|---|
| GREEN | 20 EURO | | GRAY IMAGE |
| | | X00138509354 | BINARY IMAGE |
| | | ○ | JUDGMENT |
| RED | 50 EURO | | GRAY IMAGE |
| | | V02382004192 | BINARY IMAGE |
| | | ○ | JUDGMENT |

FIG.11

FIG.13(a) GRAY IMAGE
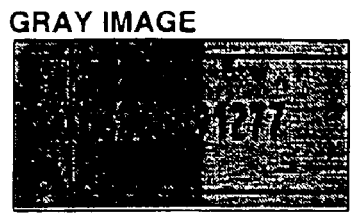
FIG.13(b)
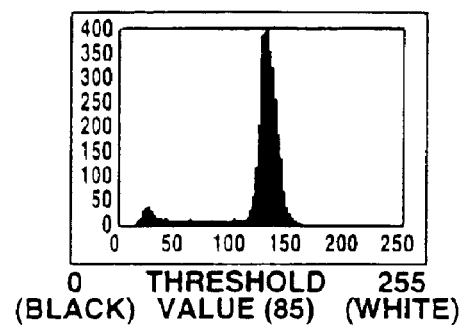
0 THRESHOLD 255
(BLACK) VALUE (85) (WHITE)
FIG.13(c) BINARY IMAGE
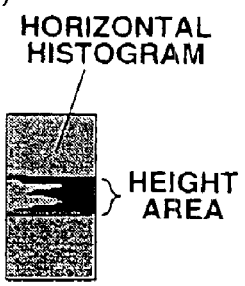
HORIZONTAL HISTOGRAM — HEIGHT AREA
FIG.13(d) SEGMENT IMAGE
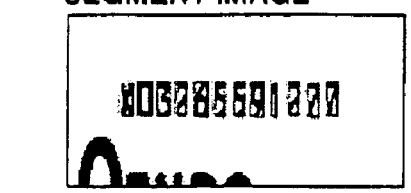
VERTICAL HISTOGRAM
SCANNING DIRECTION  CHARACTER BLOCK
FIG.13(e)

SCANNING DIRECTION

RECOGNITION RESULT

X 0 ? ? 6 5 5 9 1 2 7 7

SCANNING DIRECTION

| LIGHT SOURCE | DENOMINATION | | |
|---|---|---|---|
| GREEN | 20 EURO | 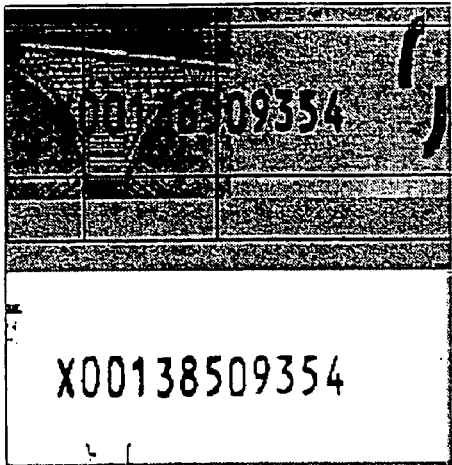 | GRAY IMAGE |
| | |  X00138509354 | BINARY IMAGE |
| | | ○ | JUDGMENT |
| | 50 EURO | 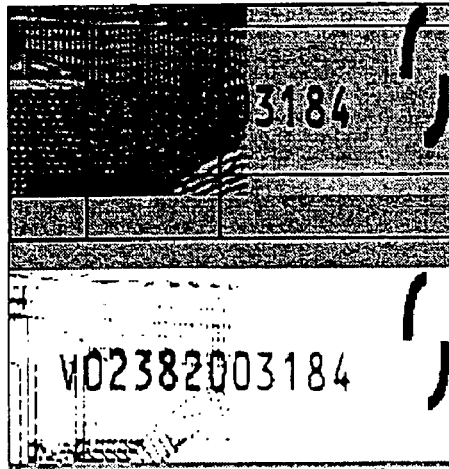 | GRAY IMAGE |
| | |  V02382003184 | BINARY IMAGE |
| | | × | JUDGMENT |
FIG.17

BILL SERIAL NUMBER READING DEVICE AND BILL SERIAL NUMBER READING METHOD

BACKGROUND OF THE INVENTION

1. Field of the Invention

The present invention relates to a bill serial number reading device and bill serial number reading method for reading the serial number printed on a bill, and more particularly to a bill serial number reading device and method for reading the serial number of bills where the character color of the serial number and the background color thereof are different depending on the bill, and for still allowing extracting and recognizing the serial number when scribbling or contamination exists on part of the serial number or when a frame error occurs.

2. Description of the Related Art

When a serial number (predetermined digits of character information comprised of alphabets and numerics) printed on a bill is read, and generally the bill is transported, light is emitted to the portion where the serial number is printed, and the reflected light thereof is captured by an image sensor and the characters are recognized, but the serial numbers may or may not be read clearly depending on the color of the irradiation light source, color of the characters of the serial number, color of the background of the characters, and other factors.

For example, in the case of a Euro bill, the serial number overlaps with the background, and the character color and the background color of the serial number differs depending on the denomination, so if one type of LED light source is used as the irradiation light source, the scanned background differs depending on the denomination due to the relationship with the color of the irradiation light source in the binary data based on the image data acquired by scanning and reading the bill, which makes it difficult to clearly extract the serial number from the binary data.

FIG. 17 is a diagram depicting the relationship between the light source emission color, gray image, binary image and judgment result for a 20 Euro bill and a 50 Euro bill.

In this case, a green LED is used as a light source, so in the binary data based on the image data (gray image) acquired by scanning and reading each of the bills, the serial number (X001138509354) appears clearly in the 20 Euro bill, because the background is gray/blue, therefore the serial number can be accurately recognized based on this binary image data, but in the case of the 50 Euro bill, where the background color is brown, the serial number (V02382003184) cannot be accurately recognized because this background color remains and overlaps with the binary image of the serial number.

As a countermeasure to prevent the drop in the recognition rate of character recognition due to the difference of the background color, Japanese Patent Application Laid-Open No. 2002-185782 discloses a device and method for irradiating light with a same color as the half tone pattern of the background of a lottery number, and accurately reading only the character part (lottery number) using a drop out color method, which cancels the color of the half tone pattern section.

Therefore there is a conventional method of dropping out the background color and reading such information as a lottery number using the drop out color method, but if this known technology is applied to reading such bills as Euro bills, where the serial number and the background overlap and the character color and background color of the serial number differ depending on the denomination, a plurality of light sources which have different emission colors, depending on the bill, must be provided, which increases cost.

On the other hand, for such a bill depositing machine as an ATM which handles Euro bills, for example, some countries require by law that information on the individual who deposits the money and the serial number (predetermined digits of the character information comprised of alphabets and numerics) of the bill deposited by this individual are stored.

This is a measure for specifying the individual who deposited the money using the serial number of the bill as a key when the deposited bill is a problem bill, such as a stolen bill.

In the case of the bill serial number reading device for this type of system, the bill is transported, light is irradiated on the portion of the bill where the serial number is printed, and the reflected light thereof is captured by the image sensor, and the characters are recognized, as mentioned above.

In this serial number recognition, if scribbling or contamination exists on a part of the serial number of the bill, as shown in FIG. 18, for example, the binary image data of this part (numbers 2 and 3 of the lower left serial number in this example) becomes one block due to the above mentioned contamination, and this part may be recognized as one digit in error, although there are actually two digits.

In the case of a method of creating an extraction window to recognize the serial number of a bill, characters of all the digits of the serial number cannot be extracted if a frame error, where a part of the serial number extends outside the frame for reading, occurs.

In this kind of conventional bill serial number reading device, if scribbling or contamination exists in a part of the serial number of a bill or if a frame error occurs, it is generally judged that the number of digits of the serial number does not match with the number of digits of a serial number of this bill, and the recognition processing of the serial number is stopped.

Therefore if the serial number of a problem bill is notified to a financial institution and this serial number happens to be a serial number which could not be recognized for the above mentioned reason, the financial institution cannot specify the individual who deposited the money from the serial number, because this serial number is not stored.

In the field of character recognition, Japanese Patent Application Laid-Open No. 2-56688 discloses a technology of creating a density histogram from the variable-density image of the printed characters, determining the threshold value from the shape of the density histogram, executing binary processing, and extracting characters, so that the desired characters are accurately detected even if density unevenness and noise are included in the background area, and each one of the detected characters becomes a binary image free of noise and character deformation.

This known technology, however, is focused on improving the accuracy of character recognition, and is not practical to meet the demand for the above mentioned system, which is recognizing the serial number accurately enough to specify the individual who deposited the money, since the processing is complicated and the processing time is lengthy.

Therefore, in the case of a conventional bill serial number reading device used for a system which stores information on an individual who deposits money and the serial number when the bill is deposited, and later specifies the individual who deposited the money by the serial number, if scribbling or contamination exists on a part of the serial number of the bill or if a frame error occurs, it is judged that the number of digits of a serial number does not match with the number of digits of the serial number of this bill, and the recognition processing of this serial number is stopped, so if this serial number which could not be recognized is the serial number of a problem bill, the financial institution cannot specify the individual who deposited the money from the serial number of the problem bill, because this serial number is not stored.

SUMMARY OF THE INVENTION

The first object of the present invention is providing a bill serial number reading device and a bill serial number reading method for accurately recognizing the serial number by dropping the background image appropriately for each denomination without using many light sources with different emission colors, even for such a bill as a Euro bill, where the serial number and background overlap and the character color and background color of the serial number differ depending on the denomination.

The second object of the present invention is providing a bill serial number reading device and a bill serial number reading method for recognizing as many characters of the serial number as possible with a simple as possible processing, and specifying the individual who deposited the money from the recognized characters of this serial number and the serial number of an actual bill, even if scribbling or contamination exists on a part of the serial number or a frame error occurs.

To achieve the first object, the invention according to Claim 1 is a bill serial number reading device for reading a serial number of a bill to be transported on a transport path, comprising: image reading means which has at least two light sources having different emission colors and an image sensor; identification means for identifying a denomination and direction of the bill being transported on the transport path; and control means for selectively driving the light sources based on information on the denomination and direction identified by the identification means and controlling the image reading means so as to scan and read a portion where a serial number of the bill being transported is printed.

The invention according to Claim 2 is the invention in claim 1, further comprising temporary holding means for sequentially taking and temporarily holding a plurality of bills which are transported in from the transport path; and bill transporting means for transporting the bill to the temporary holding means via the identification means and the image reading means, then transporting the bill in a reverse direction from the temporary holding means so as to pass through the image reading means, wherein: the control means controls the image reading means so that the bill which has passed through the identification means are transported to the temporary holding means, and the serial number of the bill is scanned and read when the bill is transported in the reverse direction from the temporary holding means and passes through the image reading means.

The invention according to Claim 3 is the invention in Claim 1, wherein first and second image reading means are disposed on a top and bottom of the transport path of the bill, and the control means performs control for selectively switching the first or second image reading means and the emission color of the light source of the each image reading means based on the information on the denomination and direction.

The invention according to Claim 4 is the invention in Claim 1, further comprising serial number recognition means for recognizing the serial number of a scanning and reading target bill based on image data which is output from the image reading means by the scanning and reading.

The invention according to Claim 5 is the invention in Claim 4, wherein the serial number recognition means comprises a plurality of serial number recognition sections for capturing the image data for one bill and recognizing the serial number of the bill, and switching means for sequentially assigning the image data for one bill by the image reading means to the each serial number recognition section.

The invention according to Claim 6 is the invention in Claim 5, wherein the serial number recognition section comprises image processing means for extracting a serial number area, which is specified based on the information on the denomination and direction, from the image data which is output from the image reading means, converting it into binary data, and recognizing the serial number from the binary data.

The invention according to Claim 7 is the invention in Claim 1, wherein the bill is a Euro bill and the light sources, which are selectively driven, are a red light source using a red LED and a green light source using a green LED.

To achieve the first object, the invention according to Claim 13 is a bill serial number reading method for reading a serial number of a bill to be transported on a transport path, including image reading means which has at least two light sources having different emission colors and an image sensor, the method comprising: identifying by identification means disposed on the transport path a denomination and direction of the bill being transported, controlling the image reading means by selectively driving the light sources based on the identified information on the denomination and direction so as to scan and read the portion where the serial number of the bill being transported is printed, and reading the serial number of the bill while selectively changing the emission colors of the light sources according to the denomination and direction of the bill.

The invention according to Claim 14 is the invention in Claim 13, further including temporary holding means for sequentially taking and temporarily holding a plurality of bills which are transported in from the transport path, wherein the method further comprises: transporting the bill to the temporary holding means via the identification means and the image reading means, then sequentially transporting the bill in the reverse direction from the temporary holding means, and scanning and reading the serial number of the bill when the bill passes through the image reading means.

The invention according to Claim 15 is the invention in Claim 13, wherein first and second image reading means are disposed at the top and bottom of the transport path of the bill, and control is performed for selectively switching the first or second image reading means and emission color of the light source of the each image reading means based on the information on the denomination and direction.

The invention according to Claim 16 is the invention in Claim 13, wherein the bill is a Euro bill and the light sources which are selectively driven are a red light source using a red LED and a green light source using a green LED.

According to the invention in Claims 1 to 7 and Claims 13 to 16, the bill is scanned and read with selectively using light sources with different emission colors based on information on the denomination and direction of the bill, so the binary image of the serial number can be clearly extracted while appropriately dropping out the background image for each denomination, and the serial number can be accurately recognized for each denomination using this binary image data.

To achieve the second object, the invention according to Claim 8 is a bill serial number reading device for reading a serial number of a bill to be transported on a transport path, comprising: identification means for identifying a denomination and direction of the bill being transported on the transport path; image reading means for selectively driving light sources based on information on the denomination and direction identified by the identification means, and scanning and reading a portion where the serial number of the bill being transported is printed; and serial number recognition means for extracting the serial number area from output image data of the image reading means based on the denomination and direction information of the bill and recognizing a character of each digit of the serial number from image data of the serial number area, replacing a character which cannot be recognized with an error character which indicates a recognition error, and adding the error character to recognized characters to output as a recognition result The invention according to Claim 9 is the invention in Claim 8, further comprising: input means for inputting information of an individual who deposited the money; storage means for storing the recognition result of the serial number recognition means corresponding to the information of the individual who deposited the money; and retrieval means for retrieving the information on the individual who deposited the money corresponding to the serial number from the storage means based on the serial number to be input.

The invention according to Claim 10 is the invention in Claim 8, further comprising problem bill serial number storage means for storing the serial number of a problem bill, and informing means for collating the recognition result of the serial number recognition means and the problem bill serial number stored in the problem bill serial number storage means and informing that a candidate of the problem bill was deposited when the characters in the recognition result, excluding error characters, match.

The invention according to Claim 11 is the invention in Claim 8, wherein the serial number recognition means comprises: means of generating a histogram in a vertical direction from the image data on the serial number area; means of calculating coordinates of a character block where black pixels exist by scanning and reading the histogram; means of calculating how many characters a character block width corresponds to based on a pre-stored character width/ inter-inter-character space information and the coordinates; means of judging whether a length of an entire character block is shorter than a normal length of the serial number area when the calculated number of characters is less than the normal number of characters of the serial number; means for checking a inter-inter-character space when the length of the entire character block is not shorter than the normal length, and if there is a block having two or more characters, replacing the characters with the error characters; and means of recognizing a respective character from each character block, excluding the character block replaced with the error characters, and generating the recognition result by combining the recognized characters and the error characters.

The invention according to Claim 12 is the invention in Claim 11, wherein the serial number recognition means further comprises: means of calculating distances from ends of a frame to a first character block at left and right respectively when the length of the entire character block is shorter than the normal length of the serial number area; means of adding error characters for the number of missing digits at the left or right, whichever distance is shorter; and means of recognizing a respective character from each character block excluding the character block where the error characters are added, and generating the recognition result by combining the recognized characters and the error characters.

To achieve the second object, the invention according to Claim 17 is a bill serial number reading method for reading a serial number of a bill to be transported on a transport path, comprising: a step of identifying a denomination and direction of the bill being transported on the transport path; a step of selectively driving light sources based on the identified information on the denomination and direction, and scanning and reading a portion where the serial number of the bill being transported is printed; and a serial number recognition step of extracting the serial number area from the image data acquired by the scanning and reading based on the information on the denomination and direction of the bill, and recognizing the character of each digit of the serial number from image data of the serial number area, replacing the character which cannot be recognized with an error character which indicates a recognition error, and adding the error character to recognized characters to output as the recognition result The invention according to Claim 18 is the invention in Claim 17, further comprising: a step of inputting information of an individual who deposited money; a step of storing the recognition result corresponding to the information on the individual who deposited money; and a step of retrieving information on the individual who deposited money corresponding to the serial number out of the stored information based on the serial number to be input The invention according to Claim 19 is the invention in Claim 17, further comprising: a step of storing the serial number of a problem bill; and a step of collating the recognition result and the problem bill serial number, and informing that a candidate of the problem bill was deposited when the characters in the recognition result, excluding the error characters, match.

According to the invention in Claims 8 to 12 and Claims 17 to 19, when the serial number area is extracted from the image data acquired by scanning and reading the bill, and character recognition is executed for each character, only a character which cannot be recognized is replaced with an error character, which indicates a recognition error, and the recognition result is output, so even if scribbling or contamination exists on a part of the serial number or if a frame error occurs, extremely simple processing of replacing only the character which cannot be recognized with an error character is performed, and the remaining characters of the serial number are recognized. Because of this, an individual who deposited money can be specified from the normally recognized characters of the serial number, excluding the error characters, and the serial number of the actual bill.

BRIEF DESCRIPTION OF THE DRAWINGS

FIGS. 6(a) to 6(d) are diagrams depicting the relationship between the reading area of a bill that can be read by the top and bottom line sensors and the direction of the reading target bill;

FIG. 7 is a table showing the correspondence of the denomination, serial number position, background color and emission color which can drop out the background image in Euro bills;

FIG. 8 is a table showing an example of the light source selection table in the serial number recognition control section;

FIG. 9 is a table showing an example of the denomination/direction management table in the serial number recognition control section;

FIG. 11 is a table showing the relationship of the light source emission color to read the serial number of a 20 Euro bill and a 50 Euro bill, gray image, binary image and judgment result thereof.

FIGS. 13(a) to 13(e) are diagrams depicting the transition of the signal corresponding to the flow of the serial number recognition processing in FIG. 12 (when extraction processing succeeded);

FIG. 17 is a table showing the relationship of the light source emission color for the 20 Euro bill and the 50 Euro bill, gray image, binary image, and judgment result.

DESCRIPTION OF THE PREFERRED EMBODIMENTS

Embodiments of the present invention will now be described with reference to the accompanying drawings.

Figure 1:
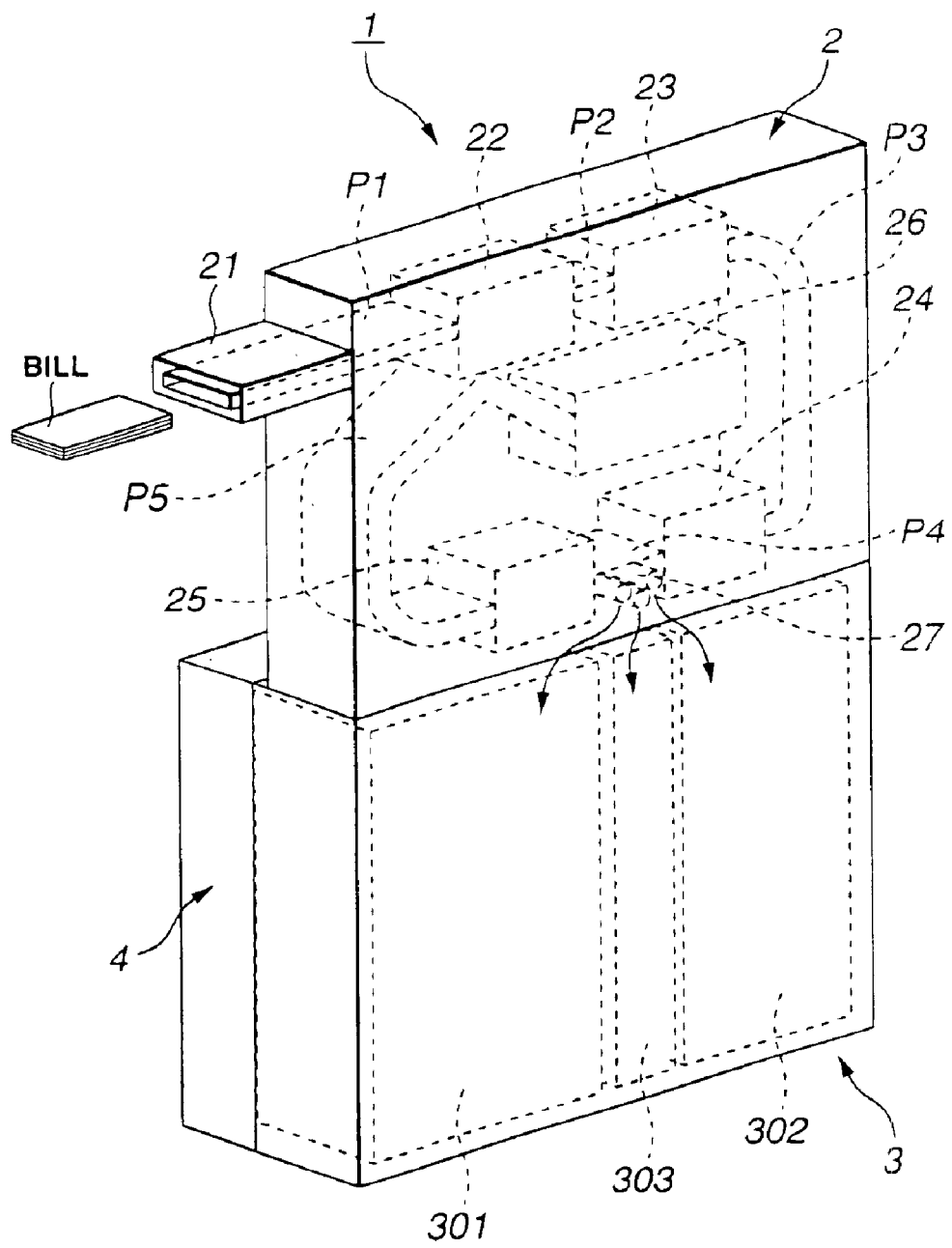
FIG. 1 is a diagram depicting the configuration of the bill deposit machine according to the present invention.

FIG. 1 is a diagram depicting the configuration of the bill deposit machine 1 according to the present invention.

This bill deposit machine 1 is for depositing Euro bills, for example, and is comprised of a bill processing unit 2, bill storage unit 3 and control unit 4.

The bill processing unit 2 is further comprised of a bill insertion port 21, reject holding section 22, feed section 23, denomination identification section 24, serial number reading section 25, temporary holding section and bill transporting means (not illustrated) which transports a bill via the transport paths (P1–P5) connecting these sections.

On the transport path between the denomination identification section 24 and the serial number reading section 25, a branching section 27, for branching transport of the bill passing through this transport path to one of the later-mentioned storage cassettes 301, 302 and 303 of the bill storage unit 3, is disposed.

The bill storage unit 3 is further comprised of the storage cassettes 301 and 302, for storing each denomination of Euro bills in a group, for example, after the serial number is read by the serial number reading section 25, and the storage cassette 303 for storing a suspicious bill.

This bill deposit machine 1 is housed in an ATM, for example, and receives commands from a host control section via communication, and executes such processing as taking in, storing and returning a bill.

The control unit 4 comprises the identification control section 50, which has various elements for controlling the operation of the bill deposit machine 1 and controls the entire unit of the bill deposit machine 1 (see FIG. 2), and the operation/display section 51, which is disposed outside the bill deposit machine 1, performs the input operation of various information (e.g. input of information on the individual who deposits the money), concerning the deposit of the bill by a touch panel or other means, and displays various information.

In this bill deposit machine 1, a stack of bills (Euro bills in this example), inserted into the bill insertion port 21 in the deposit operation by the operation/display section 51, are transported to the feed section 23 in a stacked status via the reject holding section 22, and are then fed and transported one-by-one from this feed section 23.

The bills fed from the feed section 23 pass through the denomination identification section 24, then pass through the serial number reading section 25, and are sent to the temporary holding section 26. The temporary holding section 26 has a tape winding type bill holding mechanism, and temporarily holds a plurality of bills, which are transported in from the serial number reading section 25 sequentially in a status sandwiched by the tapes.

In the transport process from the feed section 23 to the temporary holding section 26, the denomination identification section 24 recognizes the denomination and transport direction of a bill each time a bill passes through one-by-one, and manages the information on the denomination and transport direction corresponding to the sequence (ID) of the bill.

At this time, a bill which denomination cannot be judged and a bill which transport is abnormal, such as a bill being tilted or overlapping, are sent to the reject holding section 22.

Concerning the information on the bill ID, denomination and transport direction which are recognized by this denomination identification section 24, all bills in the stack which are deposited this time are fed, and of these only the bills for which denomination is identified are held in the temporary holding section 26, then only the information for these temporarily stored bills is transferred to the serial number reading section 25, and is stored in the later-mentioned denomination/direction management table.

Here, when the deposit is authenticated by the individual who deposited the money, the plurality of bills being temporarily stored in the temporary storing section 26 are transported in the reverse direction one-by-one in the sequence which is completely the opposite from the sequence when the bills are transported into the temporary storing section 26 (sequence when the bills pass through the denomination identification section 24), and are sent up to the serial number reading section 25.

When the deposit is canceled, on the other hand, all bills in the temporary storing section 26 are sent to the reject holding section 22, are collected, and transported to the bill insertion port 21 as a stack.

When the deposit is authenticated, the identification control section 50 (see FIG. 2), for controlling the entire bill deposit machine 1, monitors the output of the path sensor which is deposited in front of the image reading means (later-mentioned line sensors 35*a* and 35*b*) of the serial number reading section 25. And when the identification control section 50 detects the arrival of the bills based on the output of this path sensor, the identification control section 50 notifies the arrival of the bills to the serial number reading section 25.

When the arrival of bills is notified from the identification control section 50, the serial number reading section 25 scans and reads the arrived bills.

In this example, as described later, the serial number reading section 25 has two image reading means, each comprised of at least two light sources with different emission colors and an image sensor, where each image reading means is disposed at the top and bottom of the transport path of the bill.

When the arrived bills are scanned and read, the denomination/direction management table, where the information on the bill ID, denomination and transport direction already acquired from the denomination identification section 24 is stored, is retrieved in the reverse sequence of the bill IDs, and the light source (light source which has an emission color corresponding to the drop out color of the background image of this serial number) of the image reading means is emitted for scanning and reading according to the denomination and direction of the arrived bill.

In this example, the light sources of the image reading means are lit for both sides of the bill, but the light source on the side not in use (where the serial number printed side of the bill does not pass through) may be turned OFF.

After the serial number recognition sections 41-1–41-4 (see FIG. 2) scan and read using the image sensor for all the images of all the bills (or for a predetermined number of lines), the serial number reading section 25 ends the scanning and reading when the end is detected, and executes the serial number recognition processing based on the image data which is read by the image sensor in this scanning and reading.

The bill, which was scanned and read by the serial number reading section 25, is branched according to the preset group of denominations by the branching section 27, and is stored in the storage area of the corresponding denomination in the storage cassettes 301 and 302. This bill branching control of the branching section 27 is also executed by the identification control section 50 based on the denomination information recognized by the denomination identification section 24.

In this way, in the case of the bill deposit machine 1 according to the present invention, the denomination identification section 24 identifies the denomination and transport direction of each bill when the bill passes through the denomination identification section 24 one-by-one, the bill which passed through the denomination identification section 24 is transported to the temporary holding section 26, and when the bill is transported from the temporary holding section 26 in the reverse direction and passes through the serial number reading section 25, the serial number reading section 25 selectively drives the two light sources having different emission colors based on the information on the denomination and direction of the bill transferred from the denomination identification section 24 (denomination and direction information), and the image sensor scans and reads the portion where the serial number of the bill being transported is printed, so that the serial number of the bill is read while selectively changing the emission color of the light source according to the denomination of the bill.

Now the configuration and the operation of the serial number reading section 25 will be described.

Figure 2:
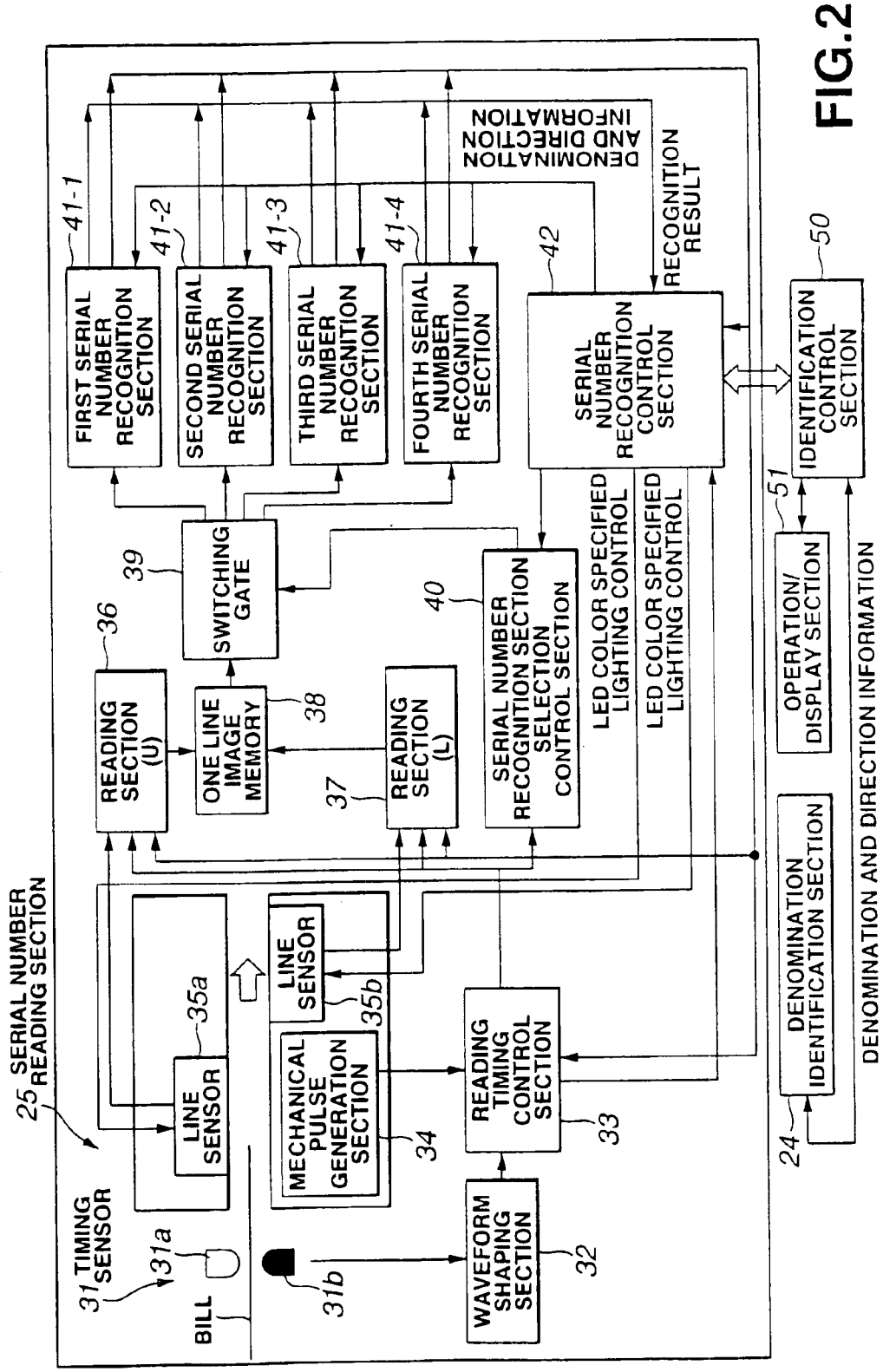
FIG. 2 is a block diagram depicting the functional configuration of the serial number reading section in FIG. 1.

FIG. 2 is a block diagram depicting the functional configuration of the serial number reading section 25.

The serial number reading section 25 is comprised of a timing sensor 31 which is further comprised of a light emitting element (LED) 31*a* and light receiving element (photo-transistor) 31*b*, a waveform shaping section 32 for shaping the waveform of the output of the light receiving element 31*b*, a read timing control section 33 for controlling the read timing based on the output of the waveform shaping section 32, a mechanical pulse generation section 34 for generating a pulse which indicates the transport amount of reading target bills, line sensors (image reading means) 35*a* and 35*b* which are disposed at the top and bottom of the bill transport path, a read section (U) 36 for reading image data from the line sensor 35*a*, a reading section (L) 37 for reading image data from the line sensor 35*b*, a one line image memory 38 for storing one line of image data which is sent from the reading section 36 or 37, a switching gate 39 for switching and outputting one line of image data which is output from the one line image memory 38 to one of the later mentioned first to fourth serial number recognition section 41-1, 41-2, 41-3 and 41-4, a serial number recognition section selection control section 40 for controlling the switching of the switching gate 39, first to fourth serial number recognition sections 41-1, 41-2, 41-3 and 41-4 for capturing image data which is switched and output from the switching gate 39 and recognizing the serial number, and a serial number recognition control section 42 for performing control required for the serial number recognition, such as light source selection and drive control of the line sensors 35*a* and 35*b* and light sources of the line sensor 35*a* and 35*b* based on the denomination and direction information transferred from the denomination identification section via the identification control section, and control for transferring the denomination and direction information to the first to fourth serial number recognition sections 41-1, 41-2, 41-3 and 41-4.

The serial number recognition control section 42 has an interface with the outside, and is connected to the identification control section 50, for example, which is disposed outside the serial number reading section 25.

Figure 3:
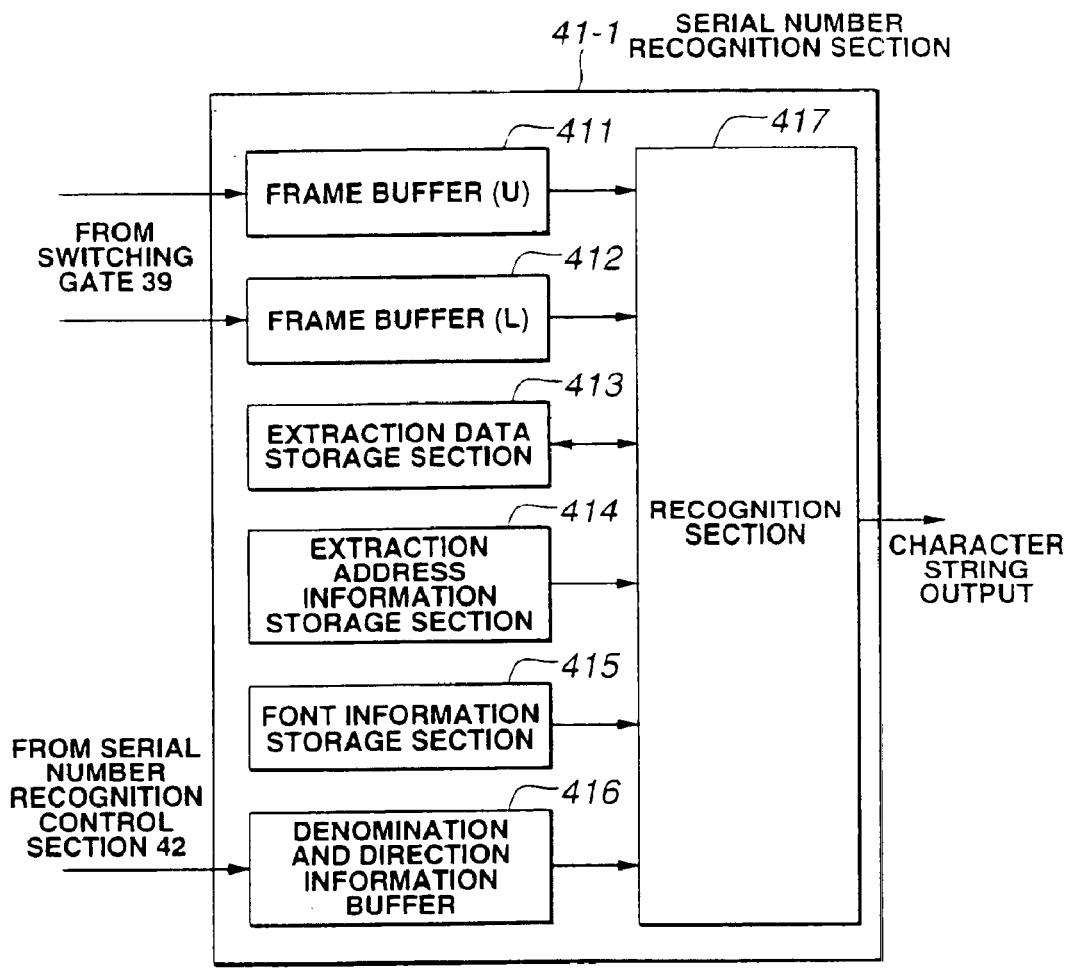
FIG. 3 is a block diagram depicting the functional configuration of the first serial number recognition section in FIG. 2.

FIG. 3 is a block diagram depicting the functional configuration of the first serial number recognition section 41-1 in FIG. 2 (serial number recognition sections 41-2, 41-3 and 41-4 have the same configurations).

This serial number recognition section 41-1 is comprised of a frame buffer (U) 411 for storing image data (image data on one side or equivalent to one side of the bill) which is input from the reading section 36 via the switching gate 39, a frame buffer (L) 412 for storing image data (image data on one side or equivalent to one side of the bill) which is input from the reading section 37 via the switching gate 39, an extracted data storage section 413 for storing the image data (image data of the serial number area) extracted from the image data which is stored in either the frame buffer 411 or 412, an extracted address information storage section 414 for storing image memory addresses to be used for extracting the image data in the serial number area for each denomination and direction information of the bill, a font information storage section 415 for storing font information for each denomination for recognizing the extracted image data, a denomination and direction information buffer 416 for storing the denomination and direction information provided from the serial number recognition control section 42, and a recognition section 417, which is further comprised of a CPU, program and memory for work, and executes serial number recognition processing.

Before describing the general operation of the serial number reading section 25, the configuration of the line sensors 35a and 35b and the bill transporting format in the transport path between these line sensors 35a and 35b will be described first.

Figure 4A:
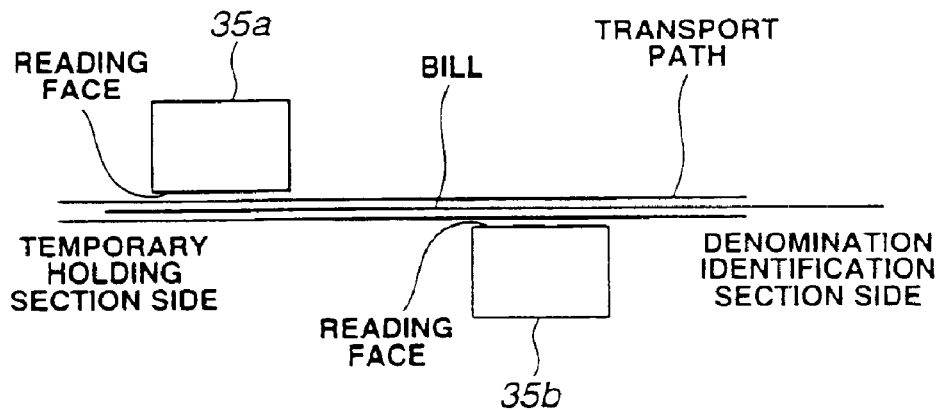
FIGS. 4(a) and 4(b) are diagrams depicting the arrangement status of the line sensors in the serial number reading section.
Figure 4B:
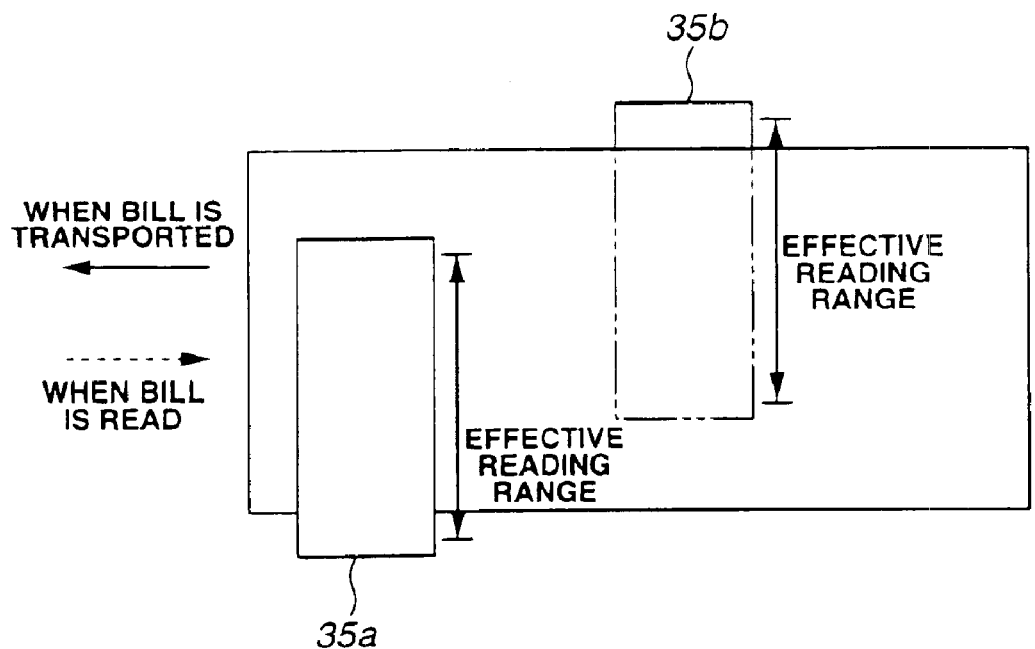

FIGS. 4(a) and 4(b) are diagrams depicting the arrangement status of the line sensors 35a and 35b in the serial number reading section 25. Here FIG. 4(a) is a conceptual side view near the positions where the line sensors 35a and 35b are arranged, and FIG. 4(b) is a conceptual top view of FIG. 4(a).

As FIGS. 4(a) and 4(b) show, the serial number reading section 25 is comprised of line sensors 35a and 35b which are disposed above and below the bill transport path respectively.

More specifically, the line sensor 35a is for reading the top face of the bill which is being transported in the dotted arrow mark direction when the serial number is read, where the reading face of the line sensor 35a is facing the top part of the transport path, and the line sensor 35b is for reading the bottom face of the bill which is being transported in the dotted arrow mark direction when the serial number is read, where the reading face of the line sensor 35b faces the bottom part of the transport path.

The line sensors 35a and 35b are in a positional relationship to be offset by each other, as shown in FIG. 4(b), and an effective reading range is set for the bill which is transported in the dotted arrow direction shown in FIG. 4(b).

Figure 5:
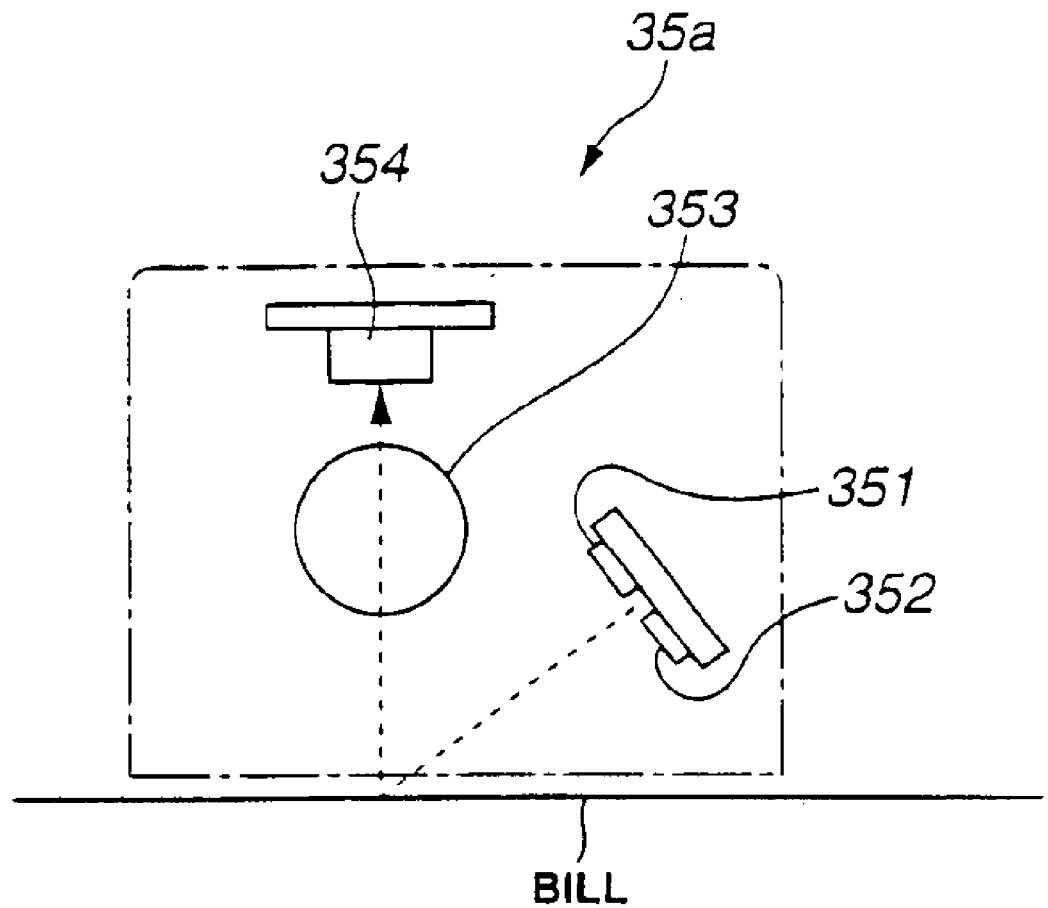
FIG. 5 is a conceptual side view depicting the configuration of the line sensors in FIGS. 4(a) and 4(b)

FIG. 5 is a conceptual side view depicting the configuration of the upper line sensor 35a in FIGS. 4(a) and 4(b).

The line sensor 35a has a red LED 351 which has a red emission color (e.g. wavelength $\lambda$=655 nm) and a green LED 352 which has a green emission color (e.g. wavelength $\lambda$=525 nm) as the light source to be used for scanning and reading of the bill.

In addition to this, the line sensor 35a comprises a rod lens array 353 which condenses the irradiation lights (indicated by a dotted line) from the LED light source on the reading face of the bill (including the serial number area), and a photodiode (line sensor) 354 for receiving reflected light from the reading face of the bill.

This top side line sensor 35a is disposed so that the reading face of the photodiode 354 faces the top side of the bill, which is transported on the transport path.

The bottom side line sensor 35b also has the same configuration as the top side line sensor 35a, except that the reading face of the photo diode 354 faces the bottom side of the bill, which is transported on the transport path.

Keeping the above structure and arrangement status of the line sensors 35a and 35b in mind, the relationship of the reading area of the bill, which can be read by the line sensors 35a and 35b, and the direction of the reading target bill will be described with reference to FIGS. 6(a) to 6(d).

FIG. 6(a) is a diagram depicting the 10 Euro bill, which passes through the transport path in the serial number reading section 25 in FIG. 4(b), in the status where the back face where the serial number is printed is face up and the numerics which indicate the denomination are upright When the bill is viewed in the status shown in FIG. 6(a), the serial number area where the serial number is printed exists at the lower left portion and the upper right portion of this bill. Hereafter the lower left and the upper right of the bill are defined based on the status shown in FIG. 6(a).

If the bill transport direction (toward the temporary holding section 26) shown in FIG. 6(a) is A1, then the bill in the transport direction A1 is transported in a reverse direction (indicated by the dotted arrow mark) when the serial number is read, and passes through this reading position. Therefore at this time, the area including the lower left serial number of this bill can be read by the top side line sensor 35a.

FIG. 6(b) is a diagram depicting the 10 Euro bill, which passes through the transport path in the serial number reading section 25 in FIG. 4(b), in the status where the back face where the serial number is printed is face up, and the numerics which indicate the denomination is in the vertically reversed status from FIG. 6(a) (inverted status).

If the bill transport direction (toward the temporary holding section 26) shown in FIG. 6(b) is B1, then the bill in the transport direction B1 is transported in a reversed direction (indicated by the dotted arrow mark) when the serial number is read, and passes through this reading position. Therefore at this time, the area including the upper right serial number of this bill can be read by the top side line sensor 35a.

FIG. 6(c) is a diagram depicting the 10 Euro bill, which passes through the transport path in the serial number reading section 25 in FIG. 4(b), in the status which is upside down of the status shown in FIG. 6(a).

If the bill transport direction (toward the temporary holding section 26) shown in FIG. 6(c) is A2, then the bill in the transport direction A2 is transported in a reverse direction (indicated by the dotted arrow mark) when the serial number is read, and passes through this reading position. Therefore at this time, the area including the lower left serial number of this bill can be read by the bottom side line sensor 35b.

FIG. 6(d) is a diagram depicting the 10 Euro bill, which passes through the transport path in the serial number reading section 25 in FIG. 4(b), in the status which is upside down of the status shown in FIG. 6(b).

If the bill transport direction (toward the temporary holding section 26) shown in FIG. 6(d) is B2, then the bill in the transport direction B2 is transported in a reversed direction (indicated by the dotted arrow mark) when the serial number is read, and passes through this reading position. Therefore at this time, the area including the upper right serial number of this bill can be read by the bottom side line sensor 35b.

In the same way, for Euro bills other than a 10 Euro bill as well, the corresponding area can be read by the top side line sensor 35a and the bottom side line sensor 35b respectively according to the bill transport directions A1, B1, A2 and B2 described in FIGS. 6(a) to 6(d).

Euro bills, however, have the characteristics where the colors of the lower left serial number and the upper right serial number of the bills and the color of the background image of the respective serial number are different, depending on the bill.

In order to increase the reading accuracy of the serial numbers of Euro bills which have the above characteristics, the serial number reading section 25 in the bill deposit machine 1 according to the present invention, two LED light sources (red LED 351 and green LED 352) are disposed in the line sensors 35a and 35b, as shown in FIG. 5, and scanning and reading is executed with selectively switching the emission color of the LED light source of the line sensors 35a and 35b according to the color of the serial number and the color of the background image.

The LED light source, which emission is driven at this serial number scanning and reading, is one of red LED 351 and green LED 352, whichever has the emission color which can drop out the background image of the serial number.

FIG. 7 is a table showing the correspondence of the denomination, serial number printed position (serial number position), color of background image (background color) and emission color (light source) which can drop out the background image in Euro bills.

According to the table in FIG. 7, in the case of the 10 Euro bill shown in FIGS. 6(a) to 6(d) as an example, for example, the dark red serial number is printed at the lower left on the gray/red background color, and the black serial number is printed at the upper right on the red background, therefore the serial number at the lower left is scanned and read using the green emission color (green LED 352), and the serial number at the upper right is scanned and read using the red emission color (red LED 351) so that the background image can be dropped out.

For the other bills as well, an appropriate emission color (drop out color) to read the serial number at the lower left and to read the serial number at the upper right can be determined from the table in FIG. 7.

In actual scanning and reading by the serial number reading section 25, whether the serial number at the lower left of each bill will be read or the serial number at the upper right will be read is uniformly determined by the transport directions A1, B1, A2 and B2 of the reading target bill at the time, as described with reference to FIGS. 6(a) to 6(d).

FIG. 8 is a table showing an example of the light source selection table in the serial number recognition control section 42 (see FIG. 2) of the serial number reading section 25, for example, based on the relationship of the transport directions A1, B1, A2 and B2 described in FIGS. 6(a) to 6(d) and the readable line sensors 35a and 35b, and the appropriate emission color (drop out color) for the case of reading the serial number at the lower left and for the case of reading the serial number at the upper right shown in the table in FIG. 7.

This light source selection table 251 is provided in advance in the storage section of the serial number recognition control section 42 (see FIG. 2) of the serial number reading section 25, for example.

In the serial number reading section 25, on the other hand, after the bills are transported to the temporary holding section 26 and held temporarily, as described above, the serial number recognition control section 42 receives the denomination and direction information of each bill from the denomination identification section 24, and stores the information in the denomination/direction management table in advance before the bills are transported in reverse, toward the serial number reading section 25 one-by-one.

FIG. 9 is an example of the denomination/direction management table 422 in the serial number recognition control section 42.

In this denomination/direction management table 422, the ID numbers ID1, ID2, ID3, . . . ) indicate the feeding and transporting sequence of the bills, denomination is information indicating the denomination of the Euro bill which corresponds to the feed number, and transport direction is information indicating one of A1, B1, A2 and B2 described in FIGS. 6(a) to 6(d).

In the serial number reading section 25, the serial number recognition control section 42 selectively drives one of the red LED 351 and the green LED 352 of the line sensors 35a and 35b for scanning and reading the bill according to the denomination and transport direction of the bill based on the light source selection table 421 which is provided in advance, and on the denomination/direction management table 422, which is constructed from the denomination and direction information transferred from the denomination identification section 24 each time each bill, which is transported from the temporary holding section 26 in a reverse direction from the feeding direction, arrives at the reading section, and controls such that the serial number can be recognized from the information acquired by this scanning and reading.

Now the operation of the serial number reading section 25 in general will be described returning to FIG. 2.

In the serial number reading section 25, the timing sensor 31 monitors that the light irradiated from the light emitting element 31a is blocked by a bill and the light receiving output of the light receiving element 31b disappears when the bill, which is transported in reverse one-by-one from the temporary holding section 26, passes through the area between the light emitting element 31a and the light receiving element 31b, so as to detect the arrival of the bill.

The waveform of the detection output of the timing sensor 31 is shaped by the waveform shaping section 32, and is sent to the reading timing control section 33.

The detection output of the timing sensor 31 may be managed by the identification control section 50, which is disposed outside the unit of the serial number reading section 25, and a trigger is provided to the serial number reading section 25 from the outside as interrupt processing.

The mechanical pulse generation section 34 generates pulses as the transport belt for transporting bills moves using a rotary encoder, and inputs the pulses to the reading timing control section 33. The section for detecting the output pulses of this mechanical pulse generation section 34 may also be disposed outside the unit of the serial number reading section 25.

The reading timing control section 33 monitors and measures the movement amount of the bill based on the pulses which are input from the mechanical pulse generation section 34, recognizes the arrival of the bill based on the detection output of the timing sensor 31, then starts the reading operation when the bill is transported for a predetermined amount of distance.

When the data for a predetermined length of the bill (bill length) is read, the serial number recognition section 41 sends the completion signal to the serial number recognition control section 42, and also to the reading timing control section 33, and the reading sections (U) and (L) 36 and 37. This control is executed repeatedly each time a bill arrives.

In the serial number recognition control section 42, the light source selection table 421 (see FIG. 8) is provided in advance, as described above, and the denomination/direction management table 422 (see FIG. 9) is constructed based on the denomination and direction information transferred from the denomination identification section 24 before a series of bills to be the reading target this time arrives.

When the signal to start the reading operation is received from the reading timing control section 33, the serial number recognition control section 42 selects one of the line sensors 35a and 35b as the side which reads this bill based on each table 421 and 422, selectively drives the read LED 351 or the green LED 352 in the selected line sensor 35a or 35b, and executes the control to scan and read the bill (LED color specified lighting control).

In this case, an LED indicates a spot light source, an LED array where individual LEDs are arranged in a line, or a photo-conductor using an LED for the light source.

The reading section 36 and the reading section 37 receives a signal to start the read operation from the reading timing control section 33, then scans and reads the image for one bill, which is output from the top side line sensor 35a and the bottom side line sensor 35b respectively, line-by-line as LED color specified lighting control is performed, and stores the image in the one line image memory 38.

The one line of image data stored in the one line image memory 38 is transferred to one of the first to fourth serial number recognition sections 41-1, 41-2, 41-3 and 41-4 sequentially via the switching gate 39, and is stored as one side of image data for one bill.

The serial number recognition section selection control section 40 instructs the switching gate 39 which one of the first to fourth serial number recognition sections 41-4, 41-2, 41-3 and 41-4 the image data, which is read line-by-line and stored in the one line image memory 38 each time, is transferred to. The serial number recognition section to be used is managed by the serial number recognition control section 42, for example.

The switching gate 39 selects the specified serial number recognition section based on the above instruction from the serial number recognition section selection control section 40, and transfers one line of image data from the one line image memory 38 to this serial number recognition section.

In the serial number reading section 25 of the present invention, the serial number recognition section selection control section 40 assigns one serial number recognition section (in standby) for each bill from the first serial number recognition section 41-1 to the fourth serial number recognition section 41-4, with priority assigned from the first serial number recognition section 41-1. The first serial number recognition section 41-1, second serial number recognition section 41-2, third serial number recognition section 41-3 and fourth serial number recognition section 4-14 may be sequentially switched.

Besides the above mentioned LED color specified lighting control, the serial number recognition control section 42 receives the information on the denomination and direction for all the bills in advance, which is sent from the denomination identification section 24 via the identification control section 50 which controls the entire bill deposit machine 1, before transport of the bill starts, and stores the information in the memory of the serial number recognition sections 41-1–41-4. In other words, the serial number recognition control section 42 also executes control for transferring the information on ID, denomination and direction to the serial number recognition section 41 (41-1, 41-2, 41-3 and 41-4) each time a bill is transported.

The serial number recognition section 41 (41-1, 41-2, 41-3 and 41-4) captures and stores one bill of image data from the reading section 36 or reading section 37 via the one line image memory 38 and the switching gate 39, extracts the image data of the serial number area from the image data based on the denomination and direction information sent from the serial number recognition control section 42, and executes the serial number recognition processing.

This serial number recognition processing will be described with reference to the configuration of the serial number recognition section 41-1 shown in FIG. 3. The other serial number recognition sections 41-2, 41-3 and 41-4 as well execute serial number recognition processing similar to the serial number recognition section 41-1.

In FIG. 3, image data for a single side of the bill, which was read by the reading section 36 and the reading section 37, is input and stored to the frame buffers 411 and 412 of the serial number recognition section 41-1 through the switching gate 39.

In the denomination and direction information buffer 416, the denomination and direction information which is sent from the serial number recognition control section 42 is stored.

The recognition section 417 first specifies the image data stored in one of the frame buffers 411 and 412 as the image data corresponding to the current recognition target bill, based on the denomination and direction information stored in the denomination and direction information buffer 416.

Then the recognition section 417 reads the image memory address of the serial number corresponding to the denomination and direction information from the extraction address information storage section 414 based on the denomination and direction information stored in the denomination and direction information buffer 416.

And based on this image memory address, the recognition section 417 extracts the image data of the area corresponding to this address (serial number area) from the previously specified image data in one of the frame buffers 411 and 412, converts this image data into binary data, and stores it to the extraction data storage section 413.

Then the recognition section 417 sequentially extracts the image data corresponding to each digit of the serial number area in the image data (binary data) stored in the extraction data storage section 413, and extracts the characteristic amount, and sequentially executes pattern matching with the font information stored in the font information storage section 415.

And the recognition section 417 holds the font information (character information) of which a pattern is matched sequentially for each digit of the serial number, and outputs the character string, which is held when the pattern matching for all the digits is completed, to the serial number recognition control section 42 as the serial number recognition result.

Figure 10:
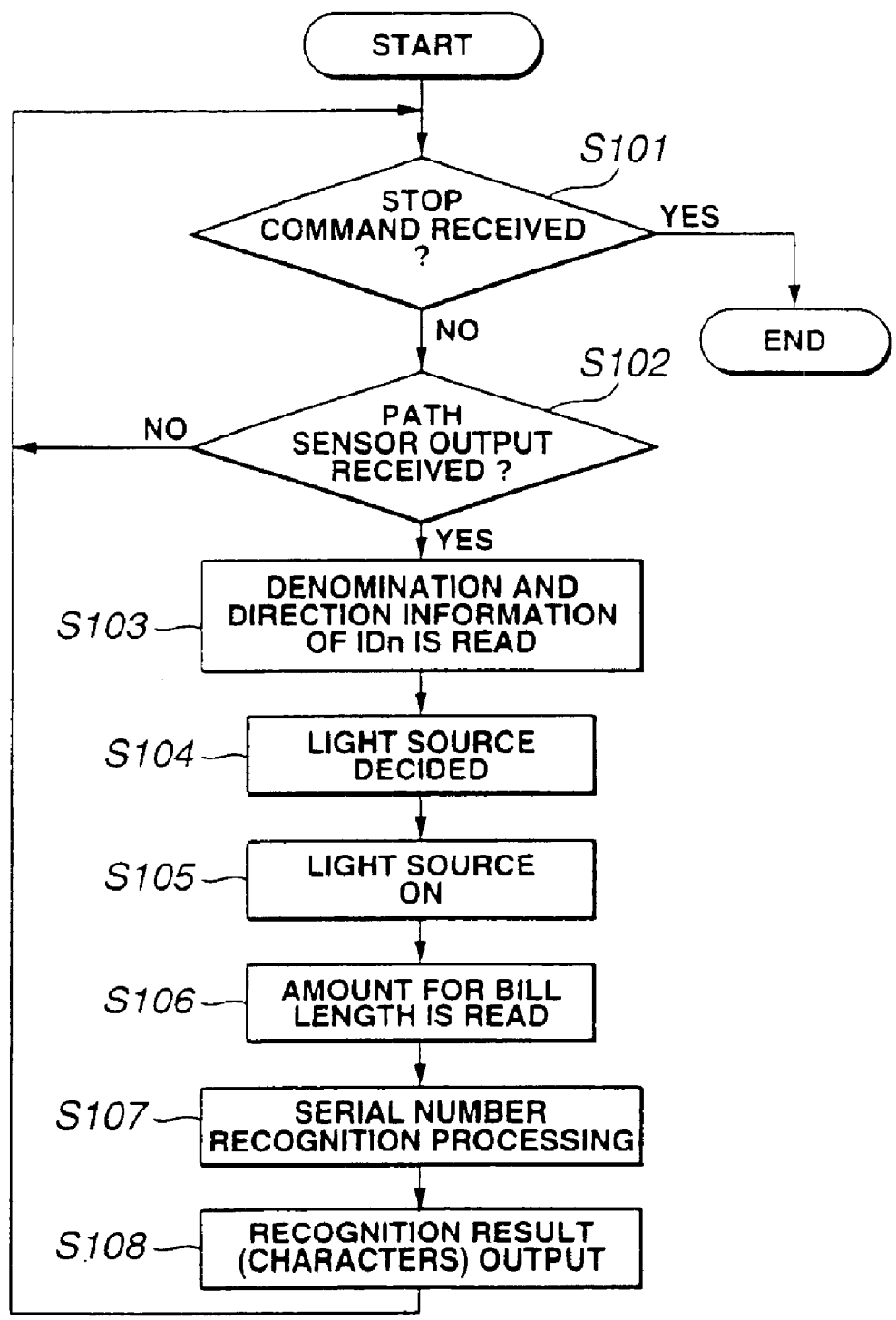
FIG. 10 is a flow chart depicting the general flow of the serial number reading operation of the serial number reading section.

FIG. 10 is a flow chart depicting the general flow of the serial number reading operation of the serial number reading section 25, including the above mentioned serial number recognition processing in the serial number recognition section 41.

As FIG. 10 shows, the serial number reading section 25 monitors whether the serial number recognition control section 42 received the stop command during the bill deposit operation in the bill deposit machine 1 (step S101), and when the stop command is not received (NO in step S101), the serial number reading section 25 monitors whether the detection output (signal to instruct the start of the read operation from the reading timing control section 33) from the path sensor 31 is received (step S102).

The stop command is sent from this identification control section 50 to the serial number recognition control section 42 during the deposit processing of one stack of bills deposited this time, when the host identification control section 50 monitors the progress of the serial number reading operation based on the bill ID, denomination and direction information received from the denomination identification section 24, and serial number reading for the stack of bills is completed.

In step S102, if the detection output from the path sensor 31 is received, in other words, if each bill, which is transported from the temporary holding section 26 in a reverse direction from the feeding direction, arrives at the reading position (YES in step S102), the serial number recognition control section 42 reads out the denomination and direction information corresponding to the ID of the bill, which arrived at this time from the denomination/direction management table 422, which was constructed based on the denomination and direction information transferred and stored from the denomination identification section 24 via the identification control section 50, while previous bills are being fed and transported (step S103).

Then the serial number recognition control section 42 retrieves the light source selection table 421 which is provided in advance using the information of the denomination and direction as a key, so that only the required light source (red LED 351 or green LED 352) remains ON (step S105), and the one bill which arrives at this time is scanned and read for the bill length (step S106).

By this scanning and reading, the image data, which is output from the line sensors 35a and 35b, is transferred from the corresponding reading section 36 or reading section 37 to one of the first to fourth serial number recognition sections 41-1, 41-2, 41-3 and 41-4 selected by the switching gate 39, and is stored.

In this case, the serial number recognition section 41-1, for example, where one sheet of image data is stored, executes the serial number recognition processing by way of the serial number area extraction processing from the image data, binary processing of the image data of the extracted serial number area, extraction processing of characters corresponding to each digit from the binary data, characteristic amount extraction processing and pattern matching processing, as described with reference to FIG. 3 (step S107), and outputs this recognition result (character string corresponding to the serial number) (step S108).

The above processing from step S101 to step S108 is executed each time one bill arrives, and when the stop command from the identification control section 50 is received (YES in step S101), the series of serial number reading operations ends.

According to the LED color specified lighting control (steps S102–106) in the serial number reading section 25, which is executed according to the flow chart in FIG. 10, in the case of the 10 Euro bill shown in FIGS. 6(a) to 6(d), for example, and when the transport direction thereof is A1 (see FIG. 6(a)), the green LED 352 is emitted and irradiated on the bill by the top side line sensor 35a based on the light source selection table 421 (see FIG. 8) when the bill is transported from the temporary holding section 26 in the reverse direction and passes through the reading position, and the reflected light thereof is scanned and read by the photodiode 354, so that the area including the serial number at the lower left of this bill is read.

In the same way, if the transport direction is A2 (see FIG. 6(c)), only the green LED 352 is emitted and irradiated on the bill by the bottom side line sensor 35b based on the light source selection table 421 (see FIG. 8), and the reflected light thereof is scanned and read by the photodiode 354, so that the area including the serial number at the lower left of this bill is read.

In the above case, where the color of the serial number at the lower left of the 10 Euro bill is dark red and the background color is gray/red (see FIG. 7), the background image can be dropped out by selecting green for the emission color, therefore the serial number can be accurately recognized in subsequent image processing (FIG. 10, step S107).

If the transport direction is B1 (see FIG. 6(b)), only the red LED 351 is emitted and irradiated on the bill by the top side line sensor 35a based on the light source selection table 421 (see FIG. 8), and the reflected light thereof is scanned and read by the photodiode 354, so that the area including the serial number at the upper right of this bill is read.

If the transport direction is B2 (see FIG. 6(b)), only the red LED 351 is emitted and irradiated on the bill by the bottom side sensor 35b based on the light source selection table 421 (see FIG. 8), and the reflected light thereof is scanned and read by the photodiode 354, so that the area including the serial number at the upper right of this bill is read.

In the above case, where the color of the serial number at the upper right of the 10 Euro bill is black and the background color is red (see FIG. 7), the background image can be dropped out by selecting red for the emission color, therefore the serial number can be accurately recognized in subsequent image processing (FIG. 10, step S107).

In the same way, other bills are also scanned and read while selectively changing the emission color of the irradiation light source according to the information on the denomination and direction of the bill, so that the background image of the serial number (12 digit characters comprised of alphabets and numerics) at the lower left or upper right can be dropped off, therefore the serial number can be accurately recognized in the subsequent image processing.

As an example, FIG. 11 shows a table which indicates the relationship of the light source emission color when the serial numbers of the 20 Euro bill and the 50 Euro bill are read based on the bill serial number reading method of the present invention, gray image, binary image and the judgment result thereof.

In this case, for the 20 Euro bill (see FIG. 7), where the color of the serial number is black and the background color thereof is gray/blue (lower left) or light blue (upper right), only green is used as the light source (green LED 352 lighting control), so the background color is dropped out and the serial number appears clearly in the binary data based on the image data (gray image) acquired by scanning and reading this bill, and therefore the serial number can be accurately recognized based on this binary image data.

For the 50 Euro bill (see FIG. 7), where the color of the serial number is dark brown (lower left) or black (upper left) and the background color thereof is gray/yellow or brown respectively, only red is used as the light source (red LED 351 lighting control), so the background color is dropped out and the serial number appears clearly in the binary data based on the image data (gray image) acquired by scanning and reading this bill, therefore the serial number can be accurately recognized based on this binary image data.

The LED light sources in this case may be an LED array where individual LEDs are arranged in a line, a light source using a photoconductor which can irradiate uniform light, or a spot type single LED light source.

In other words, for the LED light source used in the present invention (in this example, a red light source using a red LED and a green light source using a green LED), any form is acceptable, such as an LED array, LED light source using a photoconductor and single spot type LED light source, only if the light source is comprised of LEDs having the required emission colors.

For the light source driving method, normally both of the two color lights may be OFF and one light turned ON when necessary, or normally both of the two color lights may be ON and one light turned OFF when necessary.

For the photodiode as well, a photodiode array or spot type single photodiode may be used as the light receiving unit.

Now the serial number recognition processing in step S107 in FIG. 10 will be described in detail with reference to FIG. 12 and FIGS. 13(a) to 13(e).

Figure 12:
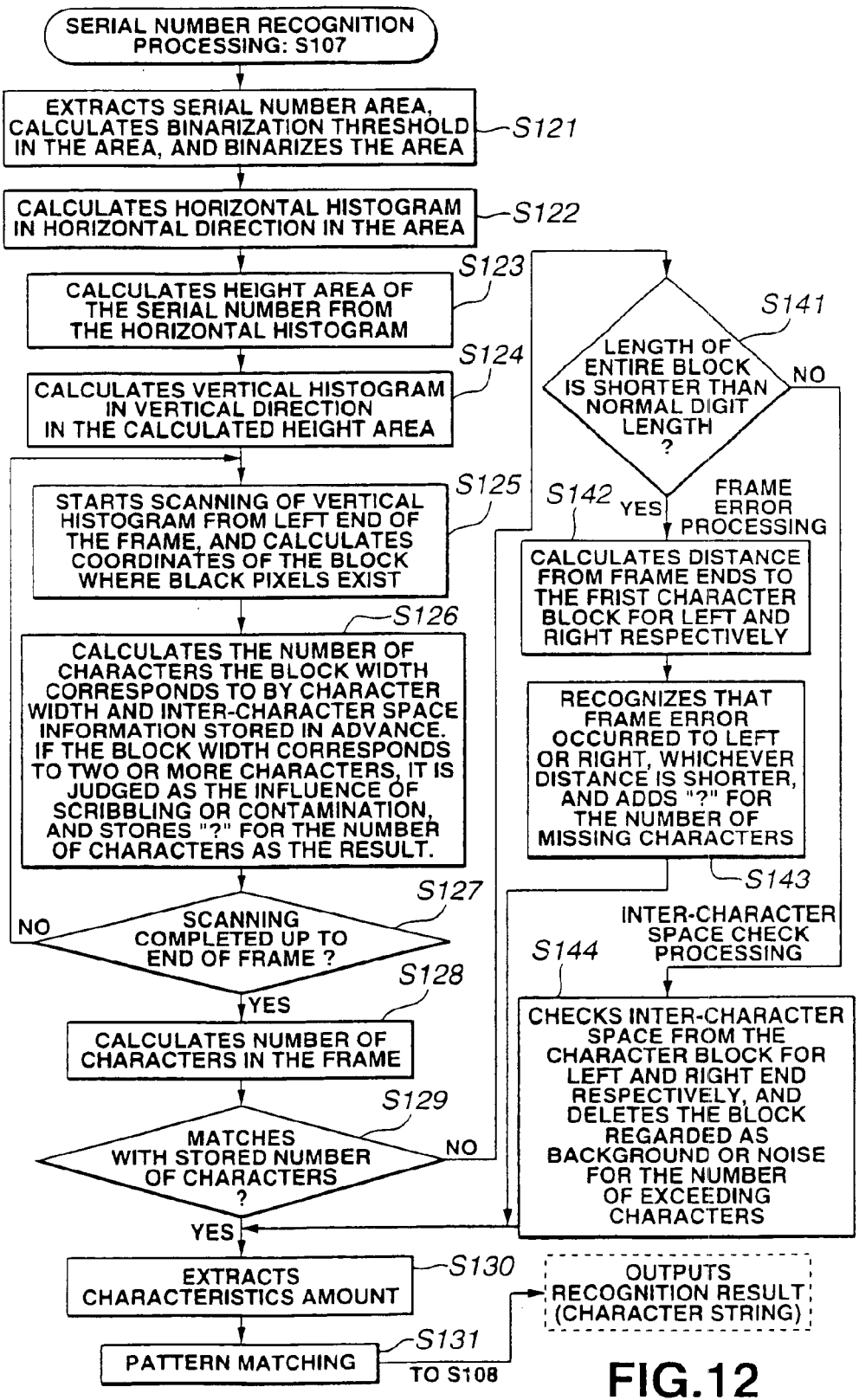
FIG. 12 is a flow chart depicting the flow of the serial number recognition processing.

Here FIG. 12 is a flow chart depicting the flow of the serial number recognition processing, and FIGS. 13(a) to 13(e) are diagrams depicting the transition of signals corresponding to the flow of this serial number recognition processing (when extraction processing succeeded).

In the serial number recognition processing shown in FIG. 12, the serial number recognition section 41 (41-1, 41-2, 41-3, and 41-4) first extracts the serial number area (see FIG. 13(a)) from the image data stored in either the frame buffer 411 or 412 based on the denomination and direction information stored in the denomination and direction information buffer 416, and calculates the binarization threshold (see FIG. 13(b)) in this area, then binarizes the serial number area image data using the binarization threshold (step S121).

Then the serial number recognition section 41 calculates a horizontal histogram in the horizontal direction from the binary data (see FIG. 13(c)) in the serial number area (step S122), and calculates the height area from the horizontal histogram (step S123), and calculates the vertical histogram in the vertical direction in this calculated height area (step S124).

Then the serial number recognition section 41 starts scanning this vertical histogram (see FIG. 13(d)) from the left end of the frame, and calculates the coordinates of the block where black pixels exist (step S125).

Then the serial number recognition section 41 calculates how many characters this block width corresponds to using character width and inter-character space information, which is stored in the font information storage section 415 in advance, for example. If the block width corresponds to two or more characters here, it is regarded as the influence of scribbling or contamination, and a predetermined specified character to indicate error recognition (error character), such as "?", is stored for the number of corresponding characters as the result (step S126).

Then the serial number recognition section 41 checks whether scanning completed up to the end of the frame (step S127), and if the scanning has not been completed (NO in step S127), the scanning in the step S125 and the character calculation processing in step S126 are continued, and if the scanning has been completed up to the end of the frame (YES in step S127), the number of characters in the frame is calculated (step S128).

Then the serial number recognition section 41 checks whether the normal number of characters of the serial number stored for this denomination bill and the above mentioned calculated number of characters match (step S129), and if the number of characters match (YES in step S129), the characteristic amount of each character is extracted by the above mentioned method (step S130), pattern matching is executed again (step S131), each one of these characters is recognized, and this recognition result is output.

The above is a flow of character recognition processing when scribbling and contamination are not on the serial number and extraction processing succeeded.

In this case, it is judged that the number of characters in the frame and the number of characters stored corresponding with the identified denomination of the bill match after the scanning of the vertical histogram (see FIG. 13(d)) completes, the serial number with the normal number of characters (e.g. 12 digits: the serial number of a US dollar bill is 10 digits including alphabets and numerics, but 12 digits of a Euro bill are used in this case) (see FIG. 13(e)) is recognized, and this is output as the recognition result Now the flow of character recognition processing when the extraction process succeeded, with scribbling or contamination existing on the serial number, will be described.

Figure 14A:
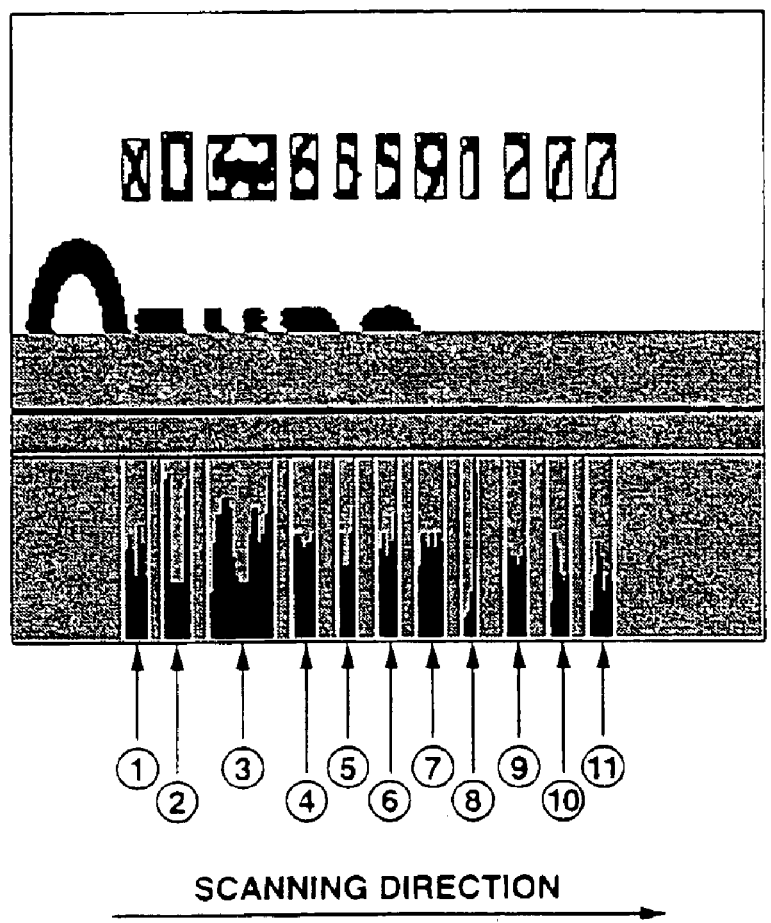
FIGS. 14(a) and 14(b) are diagrams depicting the relationship of the serial number original image and the vertical histogram in the serial number recognition processing when scribbling exists on the serial number, and the recognition result thereof.
Figure 14B:
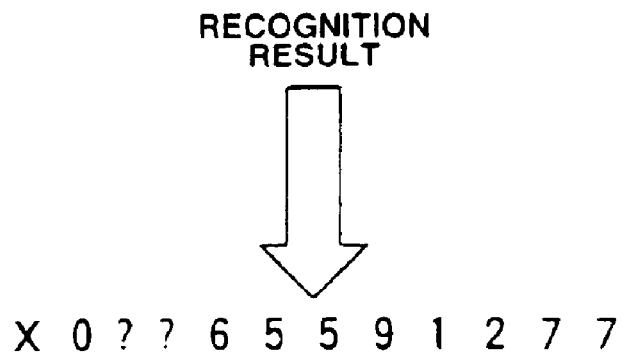

FIGS. 14(a) and 14(b) are diagrams depicting the relationship between the serial number original image and the vertical histogram (FIG. 14(a)) in the serial number recognition processing when scribbling exists on the serial number, and the recognition result (FIG. 14(b)) thereof.

In this example, as FIG. 14(a) shows, scribbling exists from "3" to "2" of the serial number "X03265591277", and a vertical histogram comprised of the black pixel block ③, which corresponds to these two or more characters, and the black pixel blocks (character blocks) ①, ②, ④–⑪ for each one of the other characters, is generated.

In the case of image data having this vertical histogram, this vertical histogram is scanned in the direction shown in FIG. 13(a) in steps S125–S127 of the flow chart shown in FIG. 12.

During this time, in step S126, it is recognized that block ③ out of the blocks ①–⑪, where black pixels exist, corresponds to two or more characters, and the recognition result for these two characters are replaced with the predetermined error character "?", and stored.

Then in step S128, the number of characters in the frame is calculated as "12", and it is judged that "12" matches with the stored number of characters "12" in step S129 (YES in step S129), so the recognition result is output via the characteristics amount extraction processing step (S130) and the pattern matching processing step (S131) and (step S108).

At this time, the serial number recognition section 41 recognizes characters respectively from each character block, except the character blocks replaced with the error character "?", and combines the recognized characters and the error character "?" for each digit, and generates the above mentioned recognition result In the case of the image data having the vertical histogram shown in FIGS. 14(a) and 14(b), since the space of the block ③ corresponds to "two characters+one inter-character space", it is recognized that two characters exist in the above mentioned inter-character space check processing (step S144), so the result of the block for these two characters is replaced with the error characters "??", and in the subsequent step S108, the recognition result "X0??65591277" shown in FIG. 14(b) is output along with the other recognition result for each block.

Now the flow of character recognition processing when scribbling or contamination exists on the serial number and when the extraction processing failed will be described.

Figure 16A:
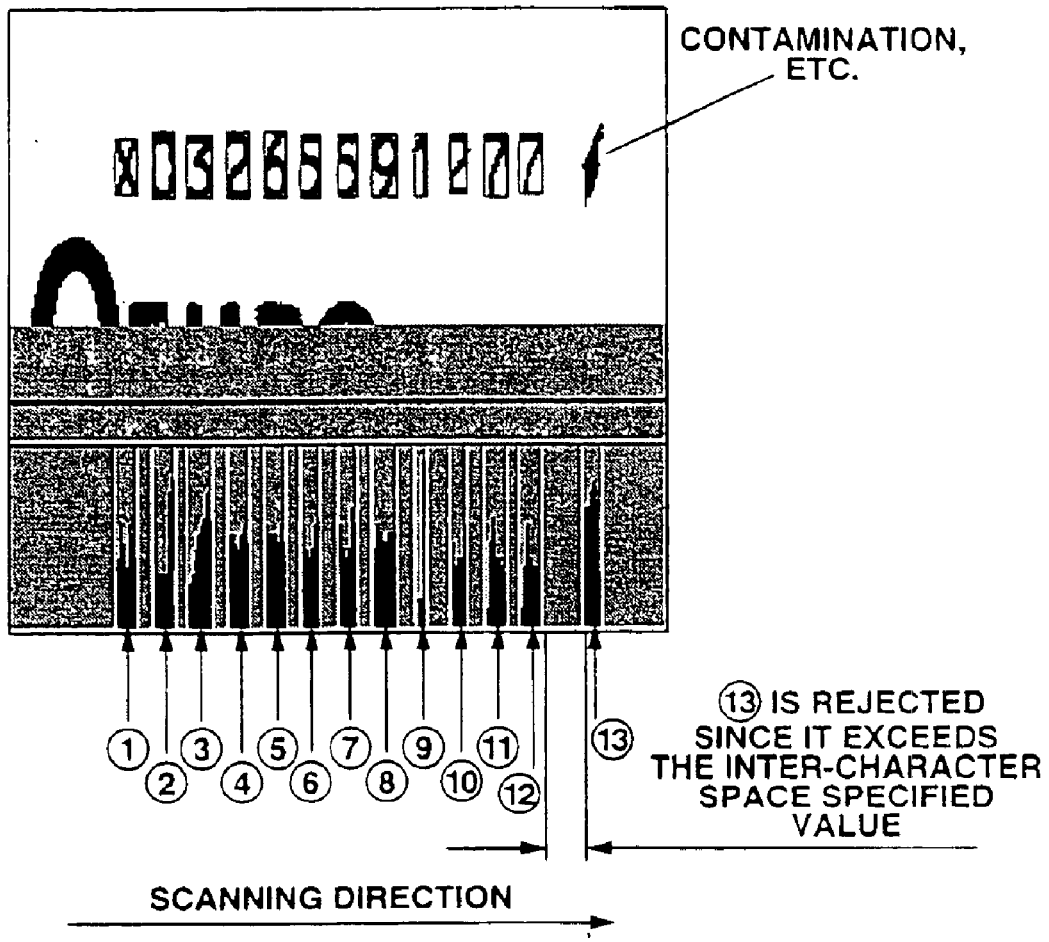
FIGS. 16(a) and 16(b) are diagrams depicting the relationship of the serial number original image and the vertical histogram in the serial number recognition processing when the inter-character space specified value is exceeded, and the recognition thereof.
Figure 16B:
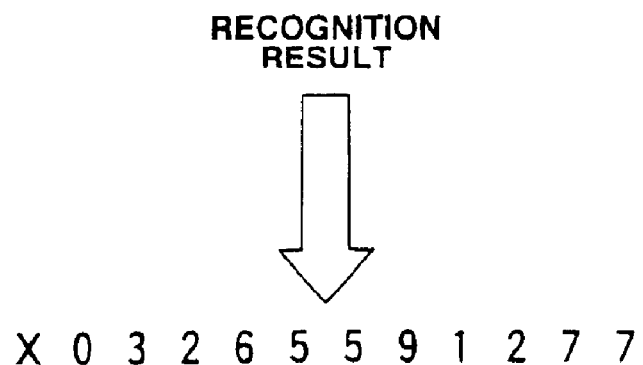
Figure 18:
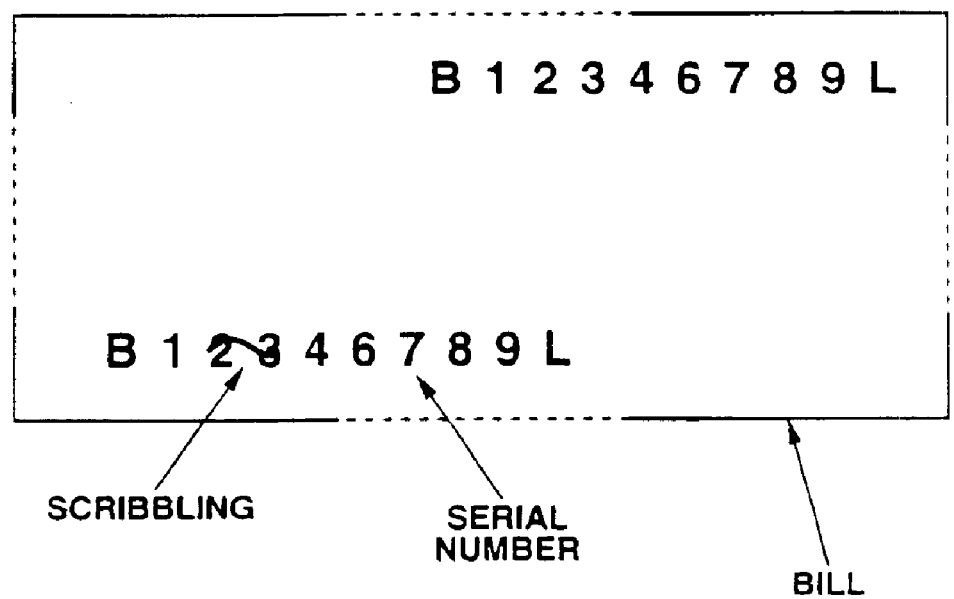
FIG. 18 is a diagram depicting an example of a bill where scribbling exists on the serial number.

FIGS. 16(a) and 16(b) are diagrams depicting the relationship between the serial number original image and the vertical histogram in serial number recognition (FIG. 16(a)) when scribbling exists somewhere other than on the serial number, and the recognition result (FIG. 16(b)) thereof In this example, as FIG. 16(a) shows, contamination exists at the right side of the serial number "X03265591277", and the vertical histogram comprised of the black pixel blocks (character block) ①–⑬ is generated.

In the case of the image data having this vertical histogram, this vertical histogram is scanned in the direction shown in FIG. 16(a) in steps S125–S127 of the flow chart shown in FIG. 12.

Then in step S128, the number of characters in the frame is calculated as "13", and it is judged that "13" does not match with the stored number of characters "12" in step S129 (NO in step S129), so the subsequent processing moves to step S141.

In step S141, the serial number recognition section 41 judges whether the length of the entire block is shorter than the normal length of the entire serial number (length of a serial number with the normal number of characters).

If the length of the entire block is shorter than the normal length of the entire serial number (YES in step S141), processing advances to the frame error processing in step S142 or later, and if the length of the entire block is not shorter than the normal length of the entire serial number (NO in step S141), then processing advances to the inter-character space check processing in step S144.

In the case of the image data having the vertical histogram shown in FIG. 16(a), it is judged that the length of the entire block is not shorter than the normal length of the entire serial number in step S141 (NO in step S141), and processing advances to the inter-character space check processing (step S144).

In step S144, the serial number recognition section 41 checks the inter-character space from the character blocks at the left and right end respectively, and for the block which seems to be a background or noise (block ③ in this example), the number of characters of which the inter-character space exceeds (one character in this example) is deleted.

Then the serial number recognition section 41 outputs the recognition result "X03265591277" via the above mentioned characteristic amount extraction processing step (S130) and the pattern matching processing step (S131).

Now the flow of character recognition processing when a frame error occurs will be described.

Figure 15A:
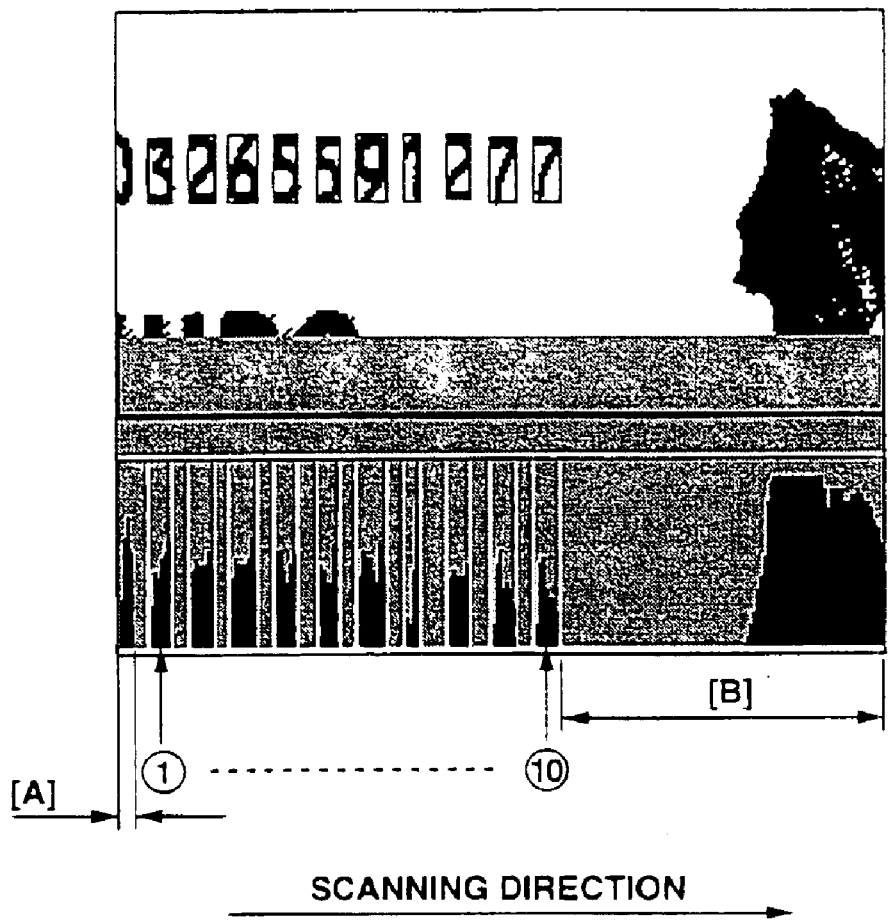
FIGS. 15(a) and 15(b) are diagrams depicting the relationship of the serial number original image and the vertical histogram in the serial number recognition processing when a frame error occurred, and the recognition result thereof.
Figure 15B:
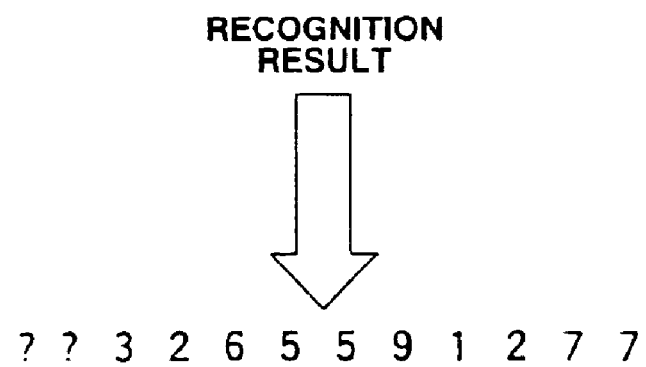

FIGS. 15(a) and 15(b) are diagrams depicting the relationship between the serial number original image and the vertical histogram at serial number recognition processing (FIG. 15(a)) when a frame error occurs where a part of the serial number extends outside the frame for reading (frame buffers 411 and 412), and the recognition result (FIG. 15(b)) thereof.

In this example, as FIG. 15(a) shows, two characters at the left end of the serial number "X03265591277" extend outside of the frame for reading, and a vertical histogram, comprised of black pixel blocks ①–⑩ corresponding to the remaining 10 characters and the block corresponding to the background at the right thereof, is generated.

In the case of image data having this vertical histogram, this vertical histogram is scanned in the direction shown in FIG. 15(a) in steps S125–S127 of the flow chart shown in FIG. 12, and during this time it is recognized that the black pixel blocks ①–⑩ correspond to one character respectively in step S126.

Then in step S128, the number of characters in the frame is calculated as "10", and it is judged that "10" does not match with the stored number of characters "12" in step S129 (NO in step S129), so the subsequent processing moves to step S141.

In the case of image data having the vertical histogram shown in FIG. 15(a), it is judged that the length of the entire block is shorter than the normal length of the entire serial number (YES in step S141), and processing advances to the frame error processing (step S142).

In step S142, the serial number recognition section 41 calculates the distances from the end of the frame to the first character block at the left and right respectively.

Then the serial number recognition section 41 compares the calculated distances at the left and right and recognizes that a frame error occurred to the shorter one (left end in this case), and adds an error character "?" for the number of missing characters (two characters in this example) (step S143).

Then the serial number recognition section 41 outputs the recognition result via the above mentioned characteristics amount extraction processing step (S130) and pattern matching processing step (S131) (and step S108).

At this time, the serial number recognition section 41 recognizes characters as mentioned above from each character block respectively excluding the character block where the error character "?" is added, combines the recognized characters and the error characters "?" for each digit, and generates the above recognition result.

In the case of image data having the vertical histogram shown in FIG. 15(a), concerning the distances [A] and [B] from the outermost digits of the serial number to the frame (see FIG. 15(a)) in the above mentioned frame error processing (steps S142, S143), the shorter side distance [A] is recognized as a frame error, and the number of missing characters (two characters) are added to the left side of the character string as the error characters "??".

By this, in the subsequent step S108, the error characters "??" for the two characters at the left end of the above mentioned character string and the recognition result for each one of the other blocks are combined, and the recognition result "??3265591277", shown in FIG. 15(b), is output.

The above mentioned recognition result of the serial number recognition section 41 is sent to the serial number recognition control section 42, and then is further sent from the serial number recognition control section 42 to the identification control section 50 (see FIG. 2).

The identification control section 50 corresponds the recognition result sent from the serial number identification control section 42 with the information of the individual who deposited this money (e.g. account number or transaction serial number of the individual who deposited the money, which is sent from the host control section), and stores this as serial number/registrant information.

To implement this, this bill deposit machine 1 has a function to input information on the individual who deposited the money through the operation/display section 51, which is comprised of a touch panel, for example, and is disposed outside the bill deposit machine 1 when the deposit starts, as described above.

The serial number recognized from the deposited bill is stored corresponding to the information on the individual who deposited the money, because when the serial number of stolen money (a problem bill) is notified to the financial institution owning the bill deposit machine 1, or when the deposited bill is later found to be counterfeit, the individual who deposited the money can be specified based on the serial number of the problem bill.

In other words, when the serial number of the problem bill is known, the individual who deposited the money corresponding to this serial number (a suspect who may be related to this problem bill) can be specified by retrieving the serial number/registrant information stored in the identification control section 50 with the serial number of this problem bill as a key, using an external information processing terminal. This retrieval function may be provided to the bill deposit machine 1 itself In the serial number recognition section 41 of the bill deposit machine 1, a character which cannot be recognized, due to scribbling or contamination (see FIGS. 14(*a*) and 14(*b*)), or characters which cannot be recognized by a frame error (see FIGS. 15(*a*) and 15(*b*)), out of each character of the serial number, is replaced by the error character "?" and recognized, and this recognition result is stored in the identification control section 50 along with the corresponding information of the individual who deposited the money at this time.

Therefore when the above mentioned retrieval is executed, the recognition result, where the numbers excluding the error character match the serial number of the problem bill, can also be retrieved, and the individual who deposited the money corresponding to this recognition result can be specified.

For example, if the serial number of the problem bill is "X03265591277", "X0??65591277" shown in FIG. 14(*b*) is flagged in the retrieval result, and information on the individual who deposited the money corresponding to the recognition result can be retrieved.

Based on this retrieval result, the financial institution detects the bill (actual bill) corresponding to the identification result "X0??65591277" where the numbers excluding "?" match the serial number of the problem bill, and if the serial number of this bill actually matches the serial number "X03265591277" of the problem bill, this individual who deposited this bill can be specified as the individual who deposited the problem bill.

In the bill deposit machine 1 according to the present invention, the serial number may be stored in advance when the serial number of the problem bill is known, so that when a bill with a serial number that matches this serial number is recognized during deposit money processing, this bill can be collected.

In this case, the serial number of the problem bill is stored in the storage section (not illustrated) of the identification control section 50 in advance. And if an individual deposits money to the bill deposit machine 1 through the above mentioned deposit operation via the operation/display section 51, the identification control section 50 receives the recognition result of the serial number of the bill deposited at this time from the serial number recognition section 41, and stores the recognition result along with the corresponding information of the individual who deposited the money at this time. The storage location of this information may be a host control device such as an ATM, or a central computer.

At this time, the identification control section 50 collates the recognition result received from the serial number recognition section 41 with the stored serial number of the problem bill, and if the recognized serial number matches the serial number of this problem bill, the branching section 27 is switched so that this bill, after the serial number is read by the serial number reading section 25, is collected by the storage cassette 302 for suspicious bills.

In the bill deposit machine 1, the recognition result, where a character which cannot be recognized is replaced with an error character "?", can also be acquired. For the recognition result including the digit replaced with the error character "?", the character string is collated with the character string of the problem bill for each digit, and if characters other than "?" match, the branching section 27 is switched and controlled so that the bill, after the serial number reading at the serial number reading section 25 completes, is collected by the storage cassette 302 for suspicious bills as a candidate for a problem bill.

By this, during the deposit processing of the bill deposit machine 1, a bill which has a serial number matching the pre-registered serial number of the problem bill, and a bill which is recognized that a part of the serial number matches with the serial number of the problem bill and the rest of the serial numbers are "?", are collected by the storage box 32 for suspicious bills.

Therefore the financial institution can identify whether the collected bill is a problem bill by collating the bill (actual bill) collected by the storage box 32 with the serial number of the problem bill, and if the collected bill is a problem bill, the individual who deposited the money can be specified from the information on the individual who was stored corresponding to this bill.

In this bill deposit machine 1, if the above mentioned suspicious bill is deposited, the information that a candidate for a problem bill is deposited may be sent to the department-in-charge, along with the serial number recognized from this suspicious bill and information on the corresponding individual who deposited the bill.

In the present embodiment, an identified bill is stored in a temporary holding section, then after the information on this bill is sent to the serial number identification control section, the bill is passed through the serial number reading section 25, but if sufficient processing time can be taken, the serial number may be read immediately after identification by the bill identification machine, or this reading operation may be included in the bill identification machine.

The present invention is not restricted by the embodiment described above with reference to the drawings, but can be modified within the scope of not changing the essential character thereof.

For example, the bill serial number reading machine according to the present invention is not limited to the above mentioned bill deposit machine 1 handling Euro bills, but can be applied to a deposit machine for other bills, such as US dollar bills.

In the bill serial number reading device according to the present invention, three or more light sources with different emission colors (within the scope of allowable cost) may be disposed according to the serial number color and the background color of the above mentioned bills to be the target of reading the serial number.

The bill serial number reading device according to the present invention is not limited to the above mentioned bill deposit machine 1, but can be applied to systems in general that store information on individuals who deposit money and the serial number of the bill when the money is deposited, and specifies the individual later using the serial number.

What is claimed is:

1. A bill serial number reading device for reading a serial number of a bill to be transported on a transport path, comprising:

image reading means which has at least two light sources having different emission colors and an image sensor;

identification means for identifying a denomination and direction of the bill being transported on the transport path; and control means for selectively driving the light sources based on information on the denomination and direction identified by the identification means and controlling the image reading means so as to scan and read a portion where a serial number of the bill being transported is printed.

2. The bill serial number reading device according to claim 1, further comprising:

temporary holding means for sequentially taking and temporarily holding a plurality of bills which are transported in from the transport path; and bill transporting means for transporting the bill to the temporary holding means via the identification means and the image reading means, then transporting the bill in a reverse direction from the temporary holding means so as to pass through the image reading means, wherein:

the control means controls the image reading means so that the bill which has passed through the identification means are transported to the temporary holding means, and the serial number of the bill is scanned and read when the bill is transported in the reverse direction from the temporary holding means and passes through the image reading means.

3. The bill serial number reading device according to claim 1, wherein first and second image reading means are disposed on a top and bottom of the transport path of the bill, and the control means performs control for selectively switching the first or second image reading means and the emission color of the light source of the each image reading means based on the information on the denomination and direction.

4. The bill serial number reading device according to claim 1, further comprising serial number recognition means for recognizing the serial number of a scanning and reading target bill based on image data which is output from the image reading means by the scanning and reading.

5. The bill serial number reading device according to claim 4, wherein the serial number recognition means comprises a plurality of serial number recognition sections for capturing the image data for one bill and recognizing the serial number of the bill, and switching means for sequentially assigning the image data for one bill by the image reading means to the each serial number recognition section.

6. The bill serial number reading device according to claim 5, wherein the serial number recognition section comprises image processing means for extracting a serial number area, which is specified based on the information on the denomination and direction, from the image data which is output from the image reading means, converting it into binary data, and recognizing the serial number from the binary data.

7. The bill serial number reading device according to claim 1, wherein the bill is a Euro bill and the light sources, which are selectively driven, are a red light source using a red LED and a green light source using a green LED.

8. A bill serial number reading device for reading a serial number of a bill to be transported on a transport path, comprising:

identification means for identifying a denomination and direction of the bill being transported on the transport path;

image reading means for selectively driving light sources based on information on the denomination and direction identified by the identification means, and scanning and reading a portion where the serial number of the bill being transported is printed; and serial number recognition means for extracting the serial number area from output image data of the image reading means based on the denomination and direction information of the bill and recognizing a character of each digit of the serial number from image data of the serial number area, replacing a character which cannot be recognized with an error character which indicates a recognition error, and adding the error character to recognized characters to output as a recognition result.

9. The bill serial number reading device according to claim 8, further comprising:

input means for inputting information of an individual who deposited the money;

storage means for storing the recognition result of the serial number recognition means corresponding to the information of the individual who deposited the money; and retrieval means for retrieving the information on the individual who deposited the money corresponding to the serial number from the storage means based on the serial number to be input.

10. The bill serial number reading device according to claim 8, further comprising problem bill serial number storage means for storing the serial number of a problem bill, and informing means for collating the recognition result of the serial number recognition means and the problem bill serial number stored in the problem bill serial number storage means and informing that a candidate of the problem bill was deposited when the characters in the recognition result, excluding error characters, match.

11. The bill serial number reading device according to claim 8, wherein the serial number recognition means comprises:

means of generating a histogram in a vertical direction from the image data on the serial number area;

means of calculating coordinates of a character block where black pixels exist by scanning and reading the histogram;

means of calculating how many characters a character block width corresponds to based on a pre-stored character width/inter-character space information and the coordinates;

means of judging whether a length of an entire character block is shorter than a normal length of the serial number area when the calculated number of characters is less than the normal number of characters of the serial number;

means for checking an inter-character space when the length of the entire character block is not shorter than the normal length, and if there is a block having two or more characters, replacing the characters with the error characters; and means of recognizing a respective character from each character block, excluding the character block replaced with the error characters, and generating the recognition result by combining the recognized characters and the error characters.

12. The bill serial number reading device according to claim 11, wherein the serial number recognition means further comprises:

means of calculating distances from ends of a frame to a first character block at left and right respectively when the length of the entire character block is shorter than the normal length of the serial number area;

means of adding error characters for the number of missing digits at the left or right, whichever distance is shorter; and means of recognizing a respective character from each character block excluding the character block where the error characters are added, and generating the recognition result by combining the recognized characters and the error characters.

13. A bill serial number reading method for reading a serial number of a bill to be transported on a transport path, including image reading means which has at least two light sources having different emission colors and an image sensor, the method comprising:

identifying by identification means disposed on the transport path a denomination and direction of the bill being transported, controlling the image reading means by selectively driving the light sources based on the identified information on the denomination and direction so as to scan and read the portion where the serial number of the bill being transported is printed, and reading the serial number of the bill while selectively changing the emission colors of the light sources according to the denomination and direction of the bill.

14. The bill serial number reading method according to claim 13, further including temporary holding means for sequentially taking and temporarily holding a plurality of bills which are transported in from the transport path, wherein the method further comprises: transporting the bill to the temporary holding means via the identification means and the image reading means, then sequentially transporting the bill in the reverse direction from the temporary holding means, and scanning and reading the serial number of the bill when the bill passes through the image reading means.

15. The bill serial number reading method according to claim 13, wherein first and second image reading means are disposed at the top and bottom of the transport path of the bill, and control is performed for selectively switching the first or second image reading means and emission color of the light source of the each image reading means based on the information on the denomination and direction.

16. The bill serial number reading method according to claim 13, wherein the bill is a Euro bill and the light sources which are selectively driven are a red light source using a red LED and a green light source using a green LED.

17. A bill serial number reading method for reading a serial number of a bill to be transported on a transport path, comprising:

a step of identifying a denomination and direction of the bill being transported on the transport path;

a step of selectively driving light sources based on the identified information on the denomination and direction, and scanning and reading a portion where the serial number of the bill being transported is printed; and a serial number recognition step of extracting the serial number area from the image data acquired by the scanning and reading based on the information on the denomination and direction of the bill, and recognizing the character of each digit of the serial number from image data of the serial number area, replacing the character which cannot be recognized with an error character which indicates a recognition error, and adding the error character to recognized characters to output as the recognition result.

18. The bill serial number reading method according to claim 17, further comprising:

a step of inputting information of an individual who deposited money;

a step of storing the recognition result corresponding to the information on the individual who deposited money; and a step of retrieving information on the individual who deposited money corresponding to the serial number out of the stored information based on the serial number to be input.

19. The bill serial number reading method according to claim 17, further comprising:

a step of storing the serial number of a problem bill; and a step of collating the recognition result and the problem bill serial number, and informing that a candidate of the problem bill was deposited when the characters in the recognition result, excluding the error characters, match.

* * * * *